United States Patent
Hata et al.

(10) Patent No.: US 8,717,941 B2
(45) Date of Patent: May 6, 2014

(54) COMMUNICATION METHOD, MOBILE AGENT DEVICE, AND HOME AGENT DEVICE

(75) Inventors: Hiroaki Hata, Ichikawa (JP); Nobuaki Futana, Bunkyo-ku (JP); Hajime Ishikawa, Funabashi (JP)

(73) Assignee: NTTPC Communications, Inc., Tokyo (JP)

( * ) Notice: Subject to any disclaimer, the term of this patent is extended or adjusted under 35 U.S.C. 154(b) by 909 days.

(21) Appl. No.: 12/093,962

(22) PCT Filed: Nov. 16, 2006

(86) PCT No.: PCT/JP2006/322804
§ 371 (c)(1),
(2), (4) Date: Oct. 3, 2008

(87) PCT Pub. No.: WO2007/058228
PCT Pub. Date: May 24, 2007

(65) Prior Publication Data
US 2009/0092095 A1    Apr. 9, 2009

(30) Foreign Application Priority Data

Nov. 16, 2005   (JP) .................................. 2005-331763

(51) Int. Cl.
*H04W 4/00* (2009.01)

(52) U.S. Cl.
USPC ............................. 370/255; 370/338; 370/389

(58) Field of Classification Search
CPC ....... H04W 80/04; H04W 8/26; H04W 88/16; H04W 12/06; H04W 36/0011; H04W 76/02; H04W 12/08; H04W 92/02; H04W 36/12; H04W 88/182; H04W 84/005; H04W 36/0033; H04W 36/14; H04W 48/16; H04W 60/005; H04W 88/08; H04W 8/02; H04W 8/085; H04W 8/20; H04W 8/24; H04W 92/20; H04L 63/058; H04L 12/2856; H04L 63/0869; H04L 69/16; H04L 29/12216; H04L 61/2007; H04L 29/12018; H04L 29/1282; H04L 61/10

USPC ......... 370/229, 231, 235, 252, 254, 255, 310, 370/328, 338, 389, 400, 401, 463, 468
See application file for complete search history.

(56) References Cited

U.S. PATENT DOCUMENTS 7,609,687 B2 * 10/2009 Kobayashi et al. ........... 370/356
(Continued)

FOREIGN PATENT DOCUMENTS

| CN | 1630259 A | 6/2005 |
| JP | 10 23076 | 1/1998 |

(Continued)

OTHER PUBLICATIONS

Hata, Hiroaki, "An Implementation of IP-VPN by using Proxy Mobile IP", IEICE Technical Report, NS2005-95, vol. 105, No. 278, pp. 87-90, (2005), (with English translation).

(Continued)

*Primary Examiner* — Yemane Mesfin
*Assistant Examiner* — Mon Cheri Davenport
(74) *Attorney, Agent, or Firm* — Oblon, Spivak, McClelland, Maier & Neustadt, L.L.P.

(57) ABSTRACT

In a communication system including a MN, a MFA connected to the MN, and a HA connected to a home network of the MN, the HA holds a layer 3 address of the HA and a source layer 3 address of a registration request by associating them with each other. The MFA transmits a layer 2 frame from the MN to the HA by encapsulating it. The HA decapsulates the frame to transmit it to the home network. When the HA receives a layer 2 frame from the home network, the HA checks that the destination layer 3 address is registered, and encapsulates the layer 2 frame to transmit it to a source layer 3 address of the registration request that is registered being associated with the destination layer 3 address. The MFA decapsulate the encapsulated layer 2 frame to transmit the layer 2 frame to the MN.

10 Claims, 18 Drawing Sheets

(56) References Cited

U.S. PATENT DOCUMENTS

| | | | |
|---|---|---|---|
| 7,707,310 B2* | 4/2010 | Thubert et al. | 709/245 |
| 2002/0067704 A1 | 6/2002 | Ton | |

FOREIGN PATENT DOCUMENTS

| | | |
|---|---|---|
| JP | 2001 224070 | 8/2001 |
| JP | 2002 77273 | 3/2002 |
| JP | 2004 7578 | 1/2004 |
| JP | 2004 349854 | 12/2004 |
| JP | 2005 204289 | 7/2005 |
| JP | 2005 252997 | 9/2005 |

OTHER PUBLICATIONS

Hata, Hiroaki, "An Implement of Auto Configuration of Mobile Foreign Agent for Proxy Mobile IP", IEICE Technical Report, SIS2005-46, pp. 5-8, (2005), (with English translation).

Perkins, C., "IP Mobility Support for IPv4", Nokia Research Center, Reference for Comments: 3344, pp. 1-89, (2002).

Extended European Search Report issued Sep. 20, 2011, in Patent Application No. 06832694.1.

Milind Kulkarni, et al., "Mobile IPv4 Dynamic Home Agent Assignment draft-ietf-mip4-dynamic-assignment-06.txt", Internet Engineering Task Force, XP015042519, Oct. 12, 2005.

S Gundavelli, et al. "Localized Mobility Management using Proxy Mobile IPv6 draft-gundavelli-netlmm-mip6-proxy-00.txt", Internet Engineering Task Force, XP015042203, Nov. 8, 2005.

Extended European Search Report issued Dec. 18, 2012 in Patent Application No. 12189037.0.

Smoot Carl-Mitchell et al., "Using ARP to Implement Transparent Subnet Gateways; RFC 1027", Internet Engineering Task Force (IETF), XP-015005965, Oct. 1987, 9 pages.

H. Levkowetz et al., "Mobile IP Traversal of Network Address Translation (NAT) Devices; RFC 3519", Internet Engineering Task Force (IETF) Standard, XP-015009301, Apr. 2003, 34 pages.

* cited by examiner

```
ID        | ADDRESS | TYPE
----------|---------|------
11111111  | A.A.A.A | MN
22222222  | B.B.B.B | HA
```

| MN ADDRESS | INCOMING ADDRESS | INCOMING PORT | ORIGINATING PORT |
|------------|------------------|---------------|------------------|
| A.A.A.A    | C.C.C.C          | 666666        | 777777           |

FIG.9

| Magic Number | Ver | Type=05h |
|---|---|---|
| Length | MPDU ||
| Hardware ID |||
| Hardware ID (cont) | Protocol Type ||
| AuthLen |||
| Basic Auth. Data <br> ... |||
| Padding <br> ... |||

FIG.10A

| Magic Number | Ver | Type=07h |
|---|---|---|
| Length | Protocol Type ||
| Address Type | Number of Address ||
| Address <br> ... |||
| Padding <br> ... |||

| ADDRESS TYPE VALUE | TYPE OF ADDRESS | LENGTH OF ADDRESS |
|---|---|---|
| 1 | MAC ADDRESS | 6 BYTES |
| 4 | IPv4 ADDRESS | 4 BYTES |
| 6 | IPv6 ADDRESS | 16 BYTES |

COMMUNICATION METHOD, MOBILE AGENT DEVICE, AND HOME AGENT DEVICE

TECHNICAL FIELD

The present invention relates to a technique for performing communications, even though a terminal moves between networks, without changing the IP address before and after the movement.

BACKGROUND ART

As a conventional technique for continuing communication using a same IP address even though a terminal moves between networks, there is Mobile IP technology that is defined in RFC3344, for example.

In the mechanism of Mobile IP defined in RFC3344, a FA (Foreign Agent) is placed in a network supporting Mobile IP beforehand. When the terminal (MN: Mobile Node) is connected to the network, the terminal discovers the FA using the protocol of Mobile IP so as to notify FA of address information of the terminal. In addition, the FA reports, to a HA (Home Agent) placed on the Internet, that the terminal is connected, and the HA registers address information on the terminal. A packet transmitted from a communication partner terminal (CN: Correspondent Node) to the terminal is routed to the HA. If a destination address of the packet is one of a terminal registered in the HA, the HA encapsulates the packet to transmit the packet to the FA. The FA transmits the packet extracted from the capsule to the terminal using a layer 2 function in a LAN of the visit destination network. A packet transmitted from the terminal is captured by the FA and is routed to the communication partner terminal.

In addition, a configuration in which the FA is not used can be available (this is called CoA mode). In the CoA mode, when the terminal (MN) is connected to a visit destination network, an address (CoA: Care of Address) in the visit destination network is provided to the terminal by DHCP and the like. In addition, the terminal has a fixed IP address, and the terminal registers the fixed IP address and the CoA to the HA. A packet from a communication partner terminal addressed to the terminal is routed to the HA, and is transmitted to the terminal using the CoA.

[Non-patent document 1] C. E. Perkins, "IP Mobility Support for IPv4," RFC3344, August, 2002

DISCLOSURE OF THE INVENTION

Problem to be Solved by the Invention

However, in the mode for using the FA in the conventional technique, it is necessary to place the FA in the visit destination network, and communication cannot be performed when the terminal moves to a network having no FA. In addition, in both of the FA mode and the CoA mode, since it is necessary to install a function of Mobile IP, there is a problem in that the conventional Mobile IP technique cannot be used in apparatuses (copy machine, POS register, for example) for which it is difficult to install the function of Mobile IP.

The present invention is contrived in view of the above-mentioned points, and an object is to provide a technique that enables the terminal to move between networks without providing a special function to the terminal and to a visit destination network.

Means for Solving the Problem

The object can be achieved by a communication method in a communication system including a user terminal, a mobile agent apparatus connected to the user terminal, and a home agent apparatus connected to a home network of the user terminal, wherein, based on a registration request transmitted by the mobile agent apparatus, the home agent apparatus registers a layer 3 address of the user terminal and a source layer 3 address of the registration request in an address correspondence table by associating them with each other, and the mobile agent apparatus holds the layer 3 address of the user terminal;

when the user terminal transmits a packet to a communication partner terminal, the mobile agent apparatus receives a layer 2 frame from the user terminal, and if a source layer 3 address in a layer 3 header in the layer 2 frame is registered, the mobile agent apparatus encapsulates the received layer 2 frame to transmit it to the home agent apparatus;

the home agent apparatus decapsulates the encapsulated layer 2 frame to extract the layer 2 frame, and transmits the layer 2 frame to the home network, and a router that accommodates the home network transfers a packet to the communication partner terminal;

when the communication partner terminal transmits a packet to the user terminal, the home agent apparatus receives a layer 2 frame from the home network, checks that a destination layer 3 address in a layer 3 header in the layer 2 frame is registered in the address correspondence table, and encapsulates the layer 2 frame to transmit it to a source layer 3 address of the registration request that is registered being associated with the destination layer 3 address; and the mobile agent apparatus receives the encapsulated layer 2 frame, decapsulates it to extract the layer 2 frame and transmit the layer 2 frame to the user terminal.

The object can be also achieved by a communication method in a communication system including a user terminal, a mobile agent apparatus connected to the user terminal, and a home agent apparatus connected to a home network of the user terminal, wherein, based on a registration request transmitted from the mobile agent apparatus, the home agent apparatus registers a layer 3 address of the user terminal and a source layer 3 address of the registration request in an address correspondence table by associating them with each other, and the mobile agent apparatus holds the layer 3 address of the user terminal;

when the user terminal transmits a packet to a communication partner terminal, the mobile agent apparatus receives a layer 2 frame from the user terminal, and if a source layer 3 address in a layer 3 header in the layer 2 frame is registered, the mobile agent apparatus encapsulates a packet obtained by deleting a layer 2 header of the received layer 2 frame to transmit it to the home agent apparatus;

the home agent apparatus decapsulates the encapsulated packet to extract the packet, and transfer the packet based on a layer 3 header;

when the communication partner terminal transmits a packet to the user terminal, the home agent apparatus receives the packet, checks that a destination layer 3 address in a layer 3 header of the packet is registered in the address correspondence table, and encapsulates the packet to transmit it to a source layer 3 address of the registration request that is registered being associated with the destination layer 3 address; and the mobile agent apparatus receives the encapsulated packet, decapsulates it to extract the packet and transmit the packet to the user terminal.

The home agent apparatus may hold identification information of a second mobile agent apparatus that should not be connected to the home agent apparatus and an address of a second home agent apparatus to which the second mobile agent apparatus should connect in an address correspondence table by associating them with each other; and when the home agent apparatus receives a registration request transmitted from the second mobile agent apparatus, the home agent apparatus may refer to the address correspondence table to transmit a redirect response including an address of the second home agent apparatus to the second mobile agent apparatus.

Effect of the Invention

According to the present invention, a technique can be realized for enabling the terminal to move between networks without providing special functions to the terminal and the visit destination network.

BRIEF DESCRIPTION OF THE DRAWINGS

FIG. 9 is a diagram showing a format of a registration request packet transmitted from the MFA to the HA;

FIG. 10A is a diagram showing a format of a registration response packet that is transmitted from the HA to the MFA;

Figure 1:
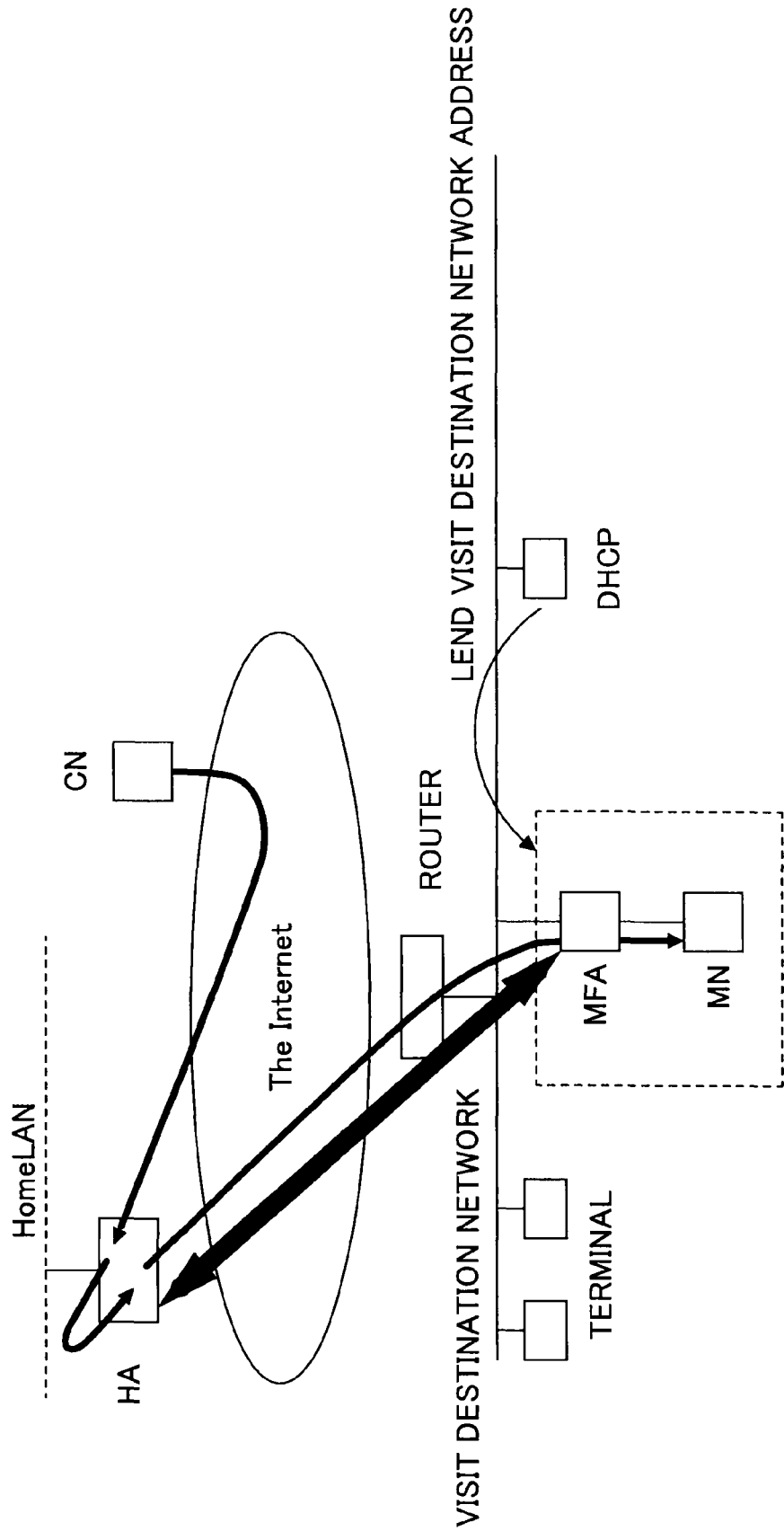
FIG. 1 is a schematic diagram of a system of an embodiment of the present invention.

DESCRIPTION OF REFERENCE SIGNS 11 polling process unit
12, 13 Ethernet™ process units
14 UDP/IP function unit
15 up-direction communication process unit
16 down-direction communication process unit
17 various tables
18 ARP process unit
21, 22 Ethernet™ process units
23 UDP/IP function unit
24 up-direction communication process unit
25 down-direction communication process unit
26 cache management unit
27 MFA master table
28 binding cache
29 ARP process unit

PREFERRED EMBODIMENTS FOR CARRYING OUT THE INVENTION

In the following, embodiments of the present invention are described with reference to figures.

(System Outline)

An outline of the system of the present embodiment is described with reference to FIG. 1. As shown in FIG. 1, the system of the present embodiment is provided with a mobile agent apparatus (to be referred to as MFA (Mobile Foreign Agent) hereinafter) that moves with a terminal (to be referred to as MN, hereinafter) that is a movement subject. By the way, the mobile agent apparatus may be embedded in the MN. In addition, the system is provided with a home agent apparatus (to be referred to as HA, hereinafter) having a function to transfer a packet, to the MFA, that is transmitted from a communication partner terminal (to be referred to as CN, hereinafter) to the MN. It is not necessary to install any special function to the MN.

As shown in FIG. 1, the MFA has two interfaces two interfaces one of which is connected to a visit destination network and another interface is connected to the MN. In the MFA, an IP address of the MN is registered beforehand. In addition, the home agent apparatus is connected to a home network of the MN. By the way, a network address of the home network is the same as a network address of the MN.

In the following, operation outline is described with reference to FIG. 1. When the MFA to which the MN is connected is connected to a visit destination network, the MFA is provided with an IP address of the visit destination network by DHCP and the like. Then, the MFA sends a registration request including an ID of the MFA (in the present embodiment, MAC address of the MFA is used as the ID) to the HA.

The HA that receives the registration request holds an IP address of the registration request transmission source and an IP address of the MN associating them with each other as a binding cache. A packet addressed to the MN that is transmitted from the CN is routed to the HA. The HA refers to the binding cache to transmit the packet, by encapsulating it, to the MFA to which the MN is connected. The MN and the MFA are connected by a layer 2 link so that the packet, received by the MFA, addressed to the MN is transmitted to the MN by the layer 2 link. When the MN transmits a packet to the CN, the MFA transmits the packet to the HA by encapsulating the packet.

[Procedure for Registration]

Although a layer 2 tunneling scheme and a layer 3 tunneling scheme are described later as application examples of the present invention, a registration procedure of information such as the binding cache is described first. The registration procedure described below is common to the layer 2 tunneling scheme and the layer 3 tunneling scheme.

Figures 2, 3, 4:
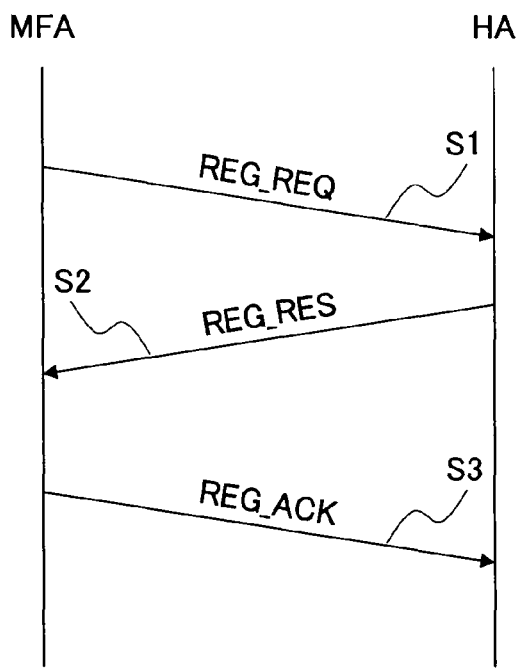
FIG. 2 is a diagram showing an example of MFA master data.
FIG. 3 is a diagram for explaining a normal registration procedure.
FIG. 4 is a diagram showing an example of a binding cache table.

IDs of MFAs, and address information of MNs connected to the MFAs or HA are set in the HA beforehand. This is called MFA master data. FIG. 2 shows an example of the MFA master data. The example shown in FIG. 2 indicates that a MFA having a MAC address of 11111111 should be connected to a MN having an IP address of A.A.A.A and that a MFA having a MAC address of 22222222 should be connected to a HA having an IP address of B.B.B.B.

First, a registration procedure is described with reference to FIG. 3 in a case in which an IP address of a proper HA is set in the MFA and the MFA sends a registration request to a proper HA.

When the MFA is connected to a visit destination network, the MFA issues a registration request (REG_REQ) including a MAC address of the MFA to the HA for generating a tunnel between the MFA and the HA (step 1).

When the HA receives the registration request, the HA obtains an IP address of the MN corresponding to a MAC address included in the registration request from the MFA master data to return a registration response (REG_RES) including the IP address to the MFA (step 2). The MFA generates a filter using the IP address.

The MFA that receives the registration response returns a registration response acknowledgement (REG_ACK) to the HA (step 3). The HA that receives the registration response acknowledgement generates an entry in the binding cache table. The entry includes, in addition to the IP address of the MN, a source IP address and a source port of the registration request (REG_REQ) packet as an incoming address and an incoming port, and includes a destination port of the registration request (REG_REQ) packet as an originating port.

FIG. 4 shows an example of the binding cache table. By the way, when a NAPT (Network Address Port Translation) apparatus exists between the MFA and the HA, the source IP address and the source port of the registration request (REG_REQ) packet become an IP address and a port number of an interface of the outside of the NAPT apparatus. That is, an IP address and a port number of an outside interface of the NAPT apparatus are stored as the incoming address and the incoming port.

In addition, in many cases, the NAPT apparatus is provided with a FW function, and there are a case in which origination to a port number to a specific port from inside of the NAPT is prohibited, and a case in which incoming of a returning packet from a specific external port is prohibited. Thus, in the present embodiment, the port that receives the registration request (REG_REQ) is not predetermined in the HA. The MFA tries to transmit the registration request (REG_REQ) to various port numbers until the registration response (REG_RES) can be received. On the other hand, even though the HA receives the registration request (REG_REQ) and transmits the registration response (REG_RES), there is no guarantee that the registration response has reached the MFA. Thus, as shown in FIG. 3, the HA does not generate the binding cache until it receives the registration response acknowledgement (REG_ACK) that is an acknowledgement of the registration response (REG_RES) from the MFA using three way handshake.

The registration request (REG_REQ) is periodically sent from the MFA to the HA and is used a keep alive of the binding cache. When the HA does not receive the registration request (REG_REQ) for equal to or greater than a predetermined time, timeout occurs so that the HA deletes a corresponding entry from the binding cache.

Figure 5:
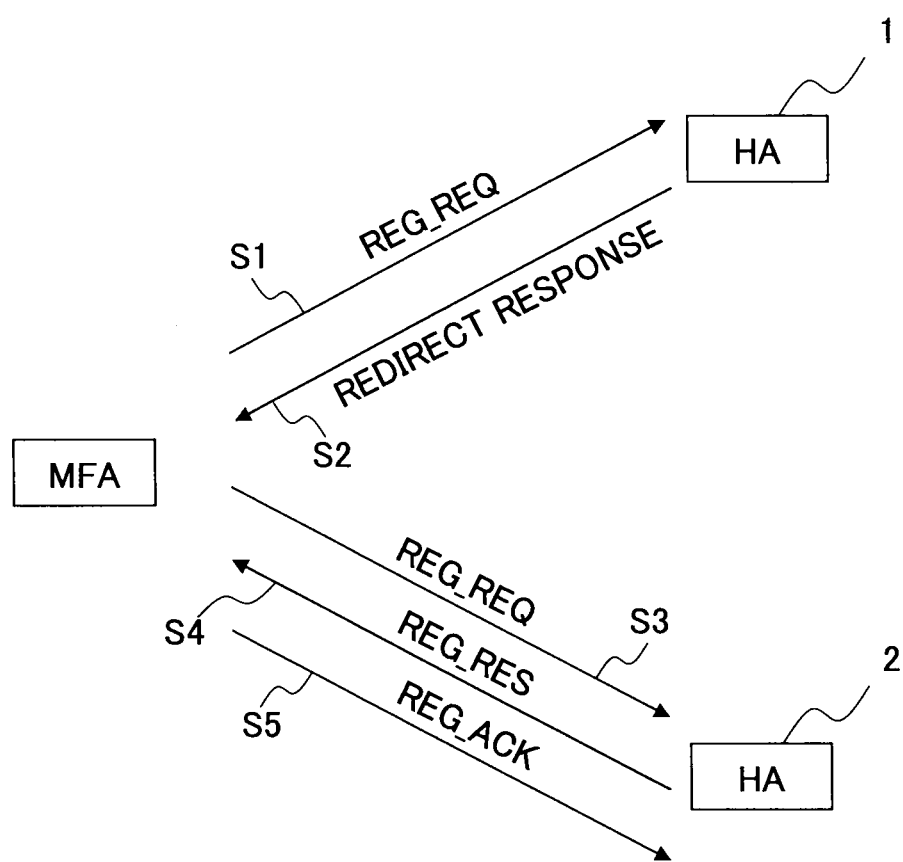
FIG. 5 is a diagram for explaining a registration procedure including redirect.

Next, a case in which the MFA does not transmit the registration request to a proper HA is described with reference to FIG. 5. When an IP address of a HA registered in the MFA is not an IP address of a HA connected to the home network of MN, a HA 1 that receives the registration request obtains an IP address of a HA 2 connected to the home network of the MN stored in the MFA master table being associated with the MAC address of the MFA to return a redirect response including the IP address to the MFA (step 2). The MFA that receives the redirect response tries to issue the registration request again to the HA 2 of the IP address included in the redirect response (step 3). Then, when the HA 2 of the destination of the registration request holds the IP address of the MN corresponding to the MAC address of the MFA, the HA 2 is a correct HA, so that the HA 2 returns a registration response as described with reference to FIG. 3 (step 4). In addition, the HA receives the registration acknowledgement response (step 5) to generate a binding cache.

By using the redirect response function, automatic setting described below can be realized.

A setting server (corresponding to HA 1 shown in FIG. 5) that is commonly used by all MFAs is provided, and the setting server stores MAC addresses of all MFAs and HA address information to which the MFAs should be connected. Each MFA holds an IP address of the setting server as factory default setting. When the MFA is connected to a network in this state, the MFA issues a registration request to the setting server. In the same way as the redirect response of the above-mentioned HA, the setting server returns a redirect response including an IP address of a HA to which the HA should connect.

This scheme can be also used when dividing a HA in operation. It is assumed that a number of MFAs accommodated in a HA becomes large, and that a HA (called a before-divided HA) is to be divided into two HAs. In this case, two HAs (called after-divided HA) are newly prepared beforehand.

Then, entries of MFAs that should be moved to the after-decided HA are rewritten to addresses of after-divided HA in entries in the MFA master table in the before-divided HA. Then, the before-divided HA returns a redirect response including an IP address of the after-divided HA for a registration request issued from a move subject MFA periodically. Accordingly, the MFA is connected to the after-divided HA.

In the following, the layer 2 tunneling scheme is described as a first embodiment, and the layer 3 tunneling scheme is described as a second embodiment.

First Embodiment

[System Configuration Outline]

Figure 6:
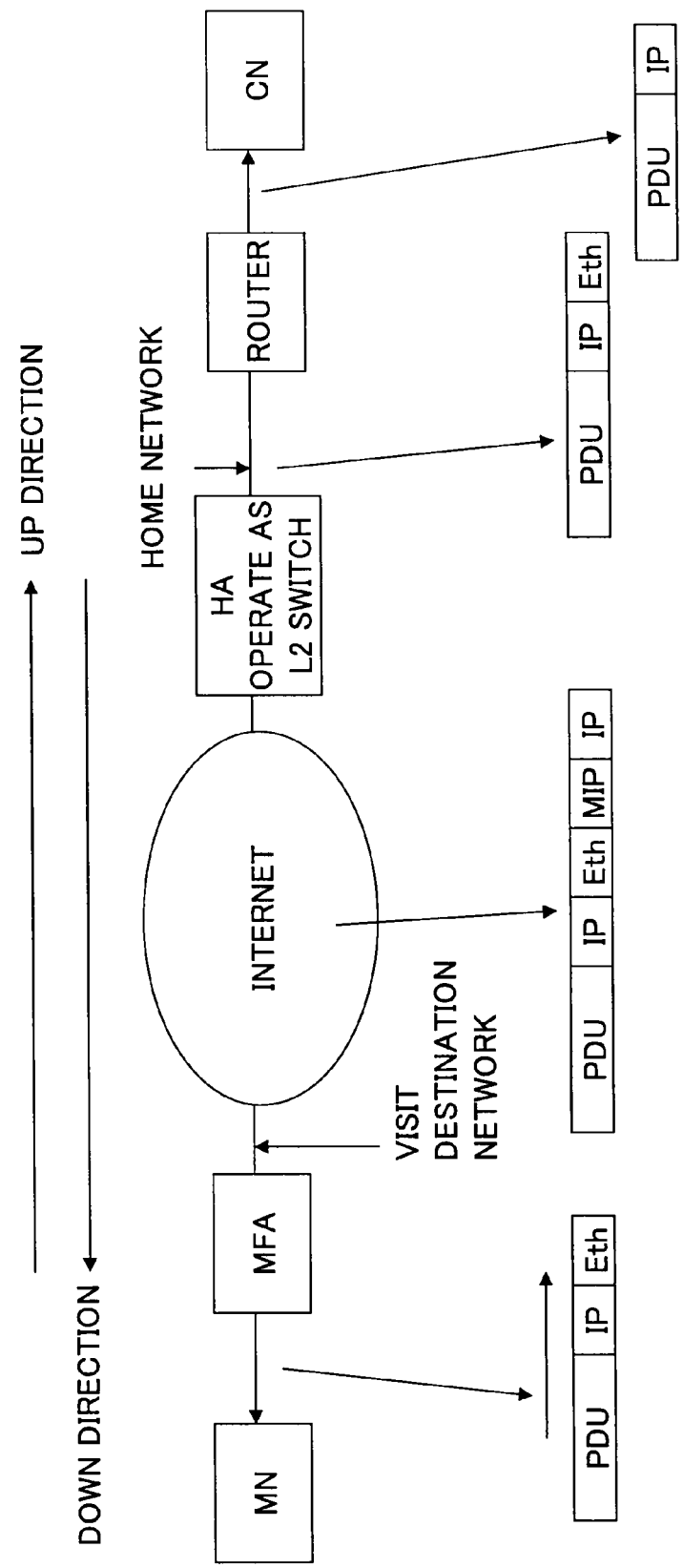
FIG. 6 is a system configuration diagram of the layer 2 tunneling scheme.

FIG. 6 shows a system configuration of the layer 2 tunneling scheme. In the layer 2 tunneling scheme, the MFA and the HA functions as a layer 2 bridge that connects between the MN and a router of the home network, and the MN is connected to the router of the home network via the layer 2 bridge. The HA is connected to the home network, and the HA functions as a layer 2 switch in the home network. In the following, an operation outline is described in a case in which the MFA and the MN exist in a visit destination network.

The MFA receives every Ethernet™ frame transmitted from the MN (for example, MN side interface of the MFA is set to be in a promiscuous mode). The MFA determines whether a source IP address in an IP header in the received Ethernet™ frame is registered. If it is registered, the MFA encapsulates the Ethernet™ frame including the Ethernet™ header using a MIP header, and transmits it to the HA. By the way, there is a case in which encapsulating and transmitting data to a specific destination are represented as "transmitting to a tunnel". An apparatus that performs decapsulation becomes an end point of the tunnel.

The HA decapsulates the received packet and transmits an obtained Ethernet™ frame to a router. The router transfers the packet by performing normal operation based on a layer 3 header.

Every Ethernet™ frame transmitted from the router to the home network is received by the HA. The HA determines whether a destination address of the layer 3 header of the received Ethernet™ frame is an address registered in the binding cache beforehand. When it is the registered address, the HA encapsulates the Ethernet™ frame using a MIP header to transmit it to the MFA. The MFA performs decapsulation to transmit the Ethernet™ frame to the MN.

When a frame to be transmitted is a broadcast frame or a multicast frame, any of the HA and the MFA adds a MIP header and transmits the packet unconditionally (transmits over a tunnel). Thus, ARP originated from MN or a router on the home network is received by every MN on the home network so that, even if the MN moves between networks with the MFA, IP communication becomes available.

[Detailed Apparatus Configuration]

Figure 7:
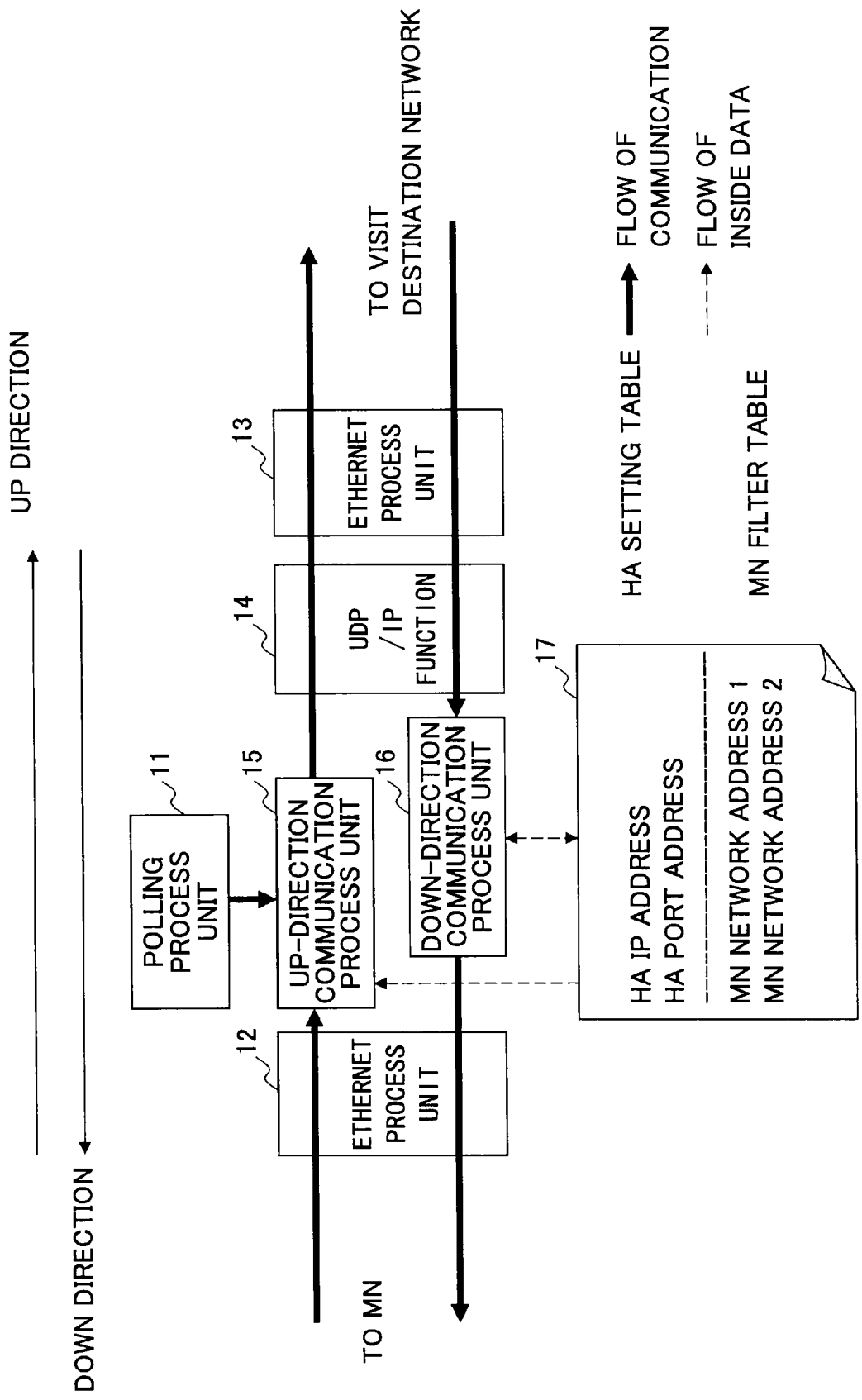
FIG. 7 is a functional block diagram of the MFA in the layer 2 tunneling scheme.

Next, functional configurations of the MFA and the HA for realizing the layer 2 tunneling scheme are described in detail. FIG. 7 shows a functional configuration of the MFA. As shown in FIG. 7, the MFA includes a polling process unit 11 for issuing a registration request, an Ethernet™ process units 12 and 13 for performing communication processes of Ethernet™, a UDP/IP function unit 14 for performing communication processes of UDP/IP, an up-direction communication process unit 15 for performing up direction communication processes, a down-direction communication process unit 16 for performing down direction communication processes, and various tables 17. The function of the MFA may be realized using a logic circuit, or may be realized by installing, into a computer including a CPU and a memory and the like, a program for realizing processes of each process unit. The program can be installed from a CD-ROM or a memory. In addition, it can be downloaded via a network. The various tables are stored in a storing apparatus such as a memory.

As shown in FIG. 7, the various tables 17 include a HA setting table and a MN filter table.

The HA setting table stores an IP address and a port number of the HA. The HA setting table is referred to by the polling process unit 11, and the polling process unit 11 periodically issues a registration request to the HA set in the table. By the way, an IP address of a setting server is set in the MFA when shipping. When the MFA is used, an IP address of a proper HA is overwritten by a registration redirect response. In addition, a port number is set by a registration response (normal registration response).

The MN filter table stores an IP address of a MN stored in a registration response packet. By the way, the IP address of the MN may be stored in the MFA beforehand. The MN filter table is one to be referred to by the up-direction communication process unit 15. When the up-direction communication process unit 15 receives an Ethernet™ frame, the up-direction communication process unit 15 reads an IP header in the frame, and when the source IP address is registered in the table, the up-direction communication process unit 15 encapsulates the frame using a MIP header and transmits it to the HA.

Figure 8:
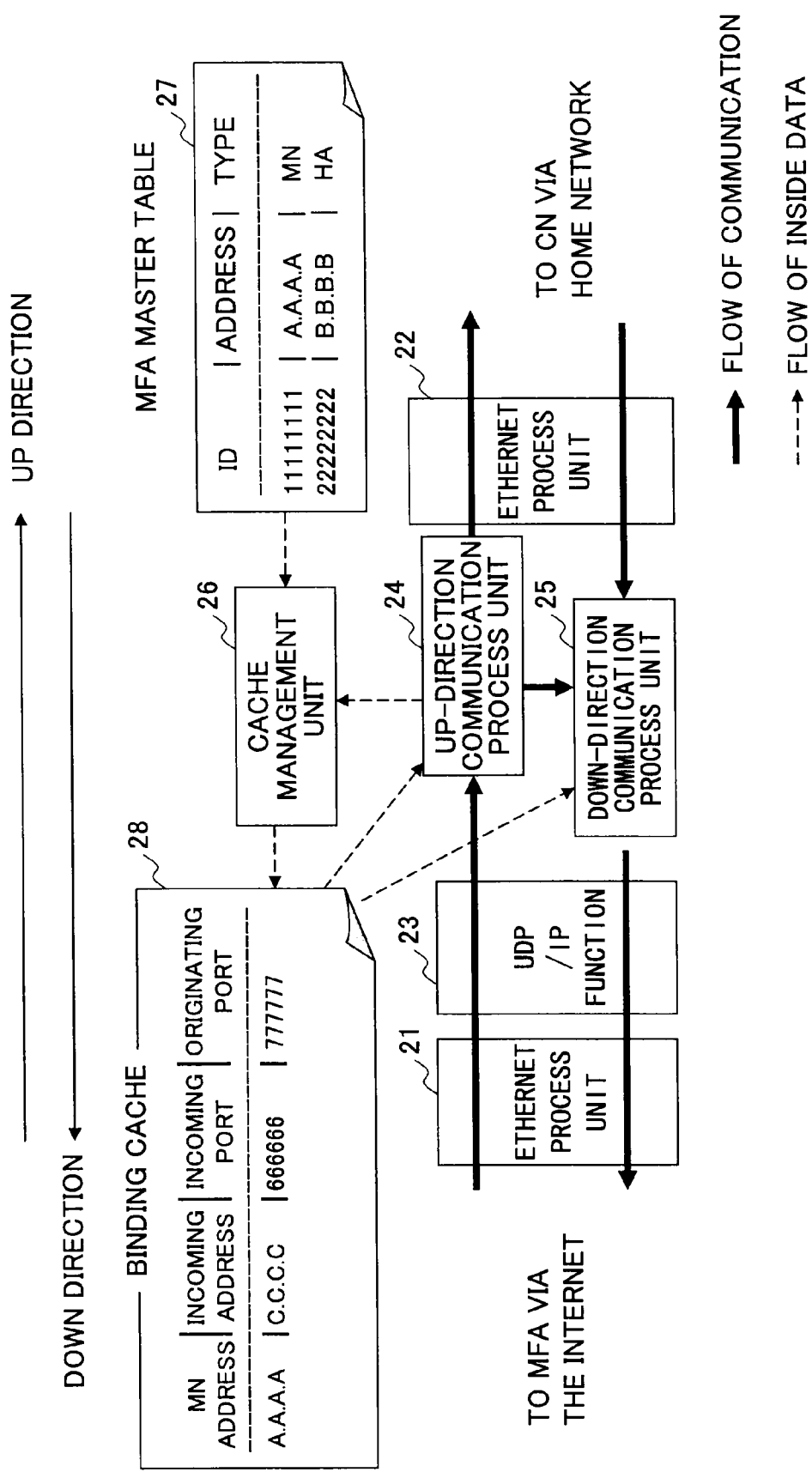
FIG. 8 is a functional block diagram of the HA in the layer 2 tunneling scheme.

Next, a functional configuration of the HA is described with reference to FIG. 8. As shown in FIG. 8, the HA includes an Ethernet™ process units 21 and 22, a UDP/IP function unit 23, an up-direction communication process unit 24, a down-direction communication process unit 25, a cache management unit 26, a MFA master table 27, and a binding cache 28. The HA can be realized by installing a program for realizing processes of each process unit into a computer having a CPU, a memory and the like. The program can be installed from a CD-ROM or a memory. In addition, the program can be downloaded via a network. In addition, the various tables and the binding cache are stored in a storing apparatus such as a memory.

Information of the MFA is stored in the MFA master table 27 beforehand by a manager and the like. The information of MFA includes hardware ID information of the MFA (MAC address in the present embodiment), an IP address and an address type that are associated with each other. When the address type is MN, the address is an IP address of an MN to be connected to the corresponding MFA. When the address type is HA, the address indicates an IP address of an HA to which the MFA should connect.

The binding cache 28 is information in which the address of the MN and the address of the MFA are associated with each other. When receiving a frame from the home network, the HA reads a destination IP address to search the binding cache. When the IP address is found, the HA encapsulates and transmits the frame to the registered IP address and port of the MFA using the registered source port number as a source port.

The binding cache 28 is automatically updated when receiving a registration response acknowledgement packet. The HA sets the incoming address and the incoming port based on the source of the registration response acknowledgement packet using the address of the MN, to which the source MFA of the registration request packet is connected, as a key. In addition, the HA sets the destination of the registration response acknowledgement packet as an originating port in the binding cache. If a registration request does not come from the MFA for equal to or greater than a predetermined time, the entry is deleted as old data.

[MIP Header]

Here, the MIP packet related to registration, and the MIP header used for encapsulation of communication data are described. By the way, following descriptions are common also to the layer 3 tunneling scheme in the second embodiment.

FIG. 9 is a diagram showing a format of the registration request packet transmitted from the MFA to the HA.

"Ver" is a version number of the system and is fixed to 2. In "Type", 05h that represents registration request is set. In "Length", a length of the whole of the packet including padding is set. "MPDU" is a maximum packet length by which dividing and combining is specified to the HA (including encapsulation header, not including UDP/IP header). Data greater than the value cannot be transmitted to the tunnel. "Hardware ID" is the MAC address set to the MFA. When the MFA has a plurality of interfaces and has a plurality of MAC addresses, a MAC address of a smallest value is set.

"ProtocolType" is used for proposing to the HA whether to use layer 2 tunneling or layer 3 tunneling as the tunnel. When using the layer 3 tunneling, it is used to specify whether the network address is Ipv4 or IPv6. "AuthLength" represents a size of BasicAuthData field using a number of bytes. "BasicAuthData" becomes a character string that is obtained by encoding a credential set in the MFA according to a scheme defined in basic authentication of RFC2617. "Padding" is a field in which any data can be set for arbitrarily changing the size of the packet.

FIG. 10A shows a format of a registration response packet that is transmitted from the HA to the MFA. In "Type", 07h representing that the packet is the registration response packet is set. In "Length", a length of the whole of the packet including padding is set. In "Protocol Type", a result for a registration request is set. When the field is 0010h, it indicates registration approved, and when the field is 0020h, it indicates redirection. Address information is reported in both of registration approval and redirection.

"AddressType" is a protocol of address. According to this, a data length per one address is determined. "Number of Address" specifies a number of addresses stored after that. Concrete values of "AddressType", protocol and address length are as shown in FIG. 10B.

Figures 10B, 11:
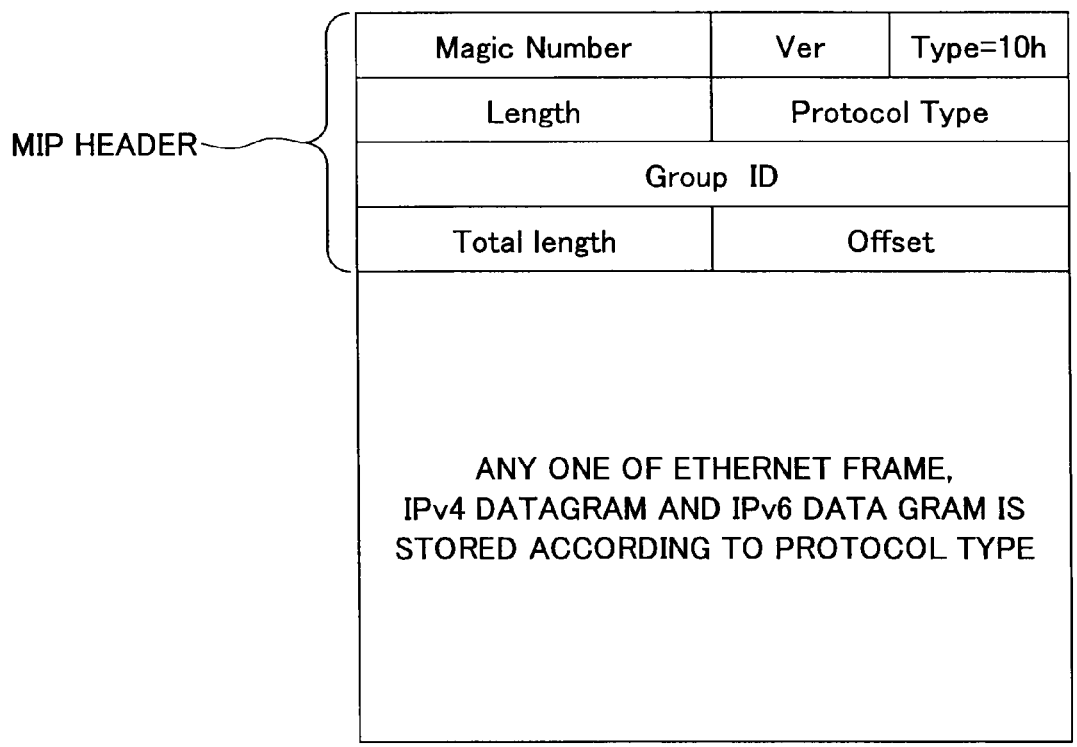
FIG. 10B is a diagram showing a format of a registration response packet that is transmitted from the HA to the MFA.
FIG. 11 is a diagram showing a format of a frame encapsulated packet (Data) to be transmitted by the HA and the MFA with each other.

FIG. 11 shows a format of a frame encapsulated packet (Data) to be transmitted by the HA and the MFA with each other. In "Type", 10h representing that the packet is Data is set. In "Length", a length of the whole packet is set. In "Protocol Type", a tunneling scheme (type of L2 tunnel or L3 tunnel) authenticated when performing registration is set. When this identifier specifies L2, the data part is a L2 frame including an Ethernet™ header. When the identifier specifies L3, the data part becomes an IP datagram including an IP header. The group ID is non-0 when this packet is a segment that is obtained by dividing a frame. Only when "GroupIP" is non-0, "TotalLength" and "Offset" fields become valid, and it indicates that long data is divided and encapsulated. The HA and the MFA combine data segments having a same GroupIP so as to transmit to the MN or CN.

[Detailed Operation]

Next, operation of each apparatus in the layer 2 tunneling scheme is described in detail. By the way, following registration operation of the MFA and the HA are common to the layer 3 tunneling scheme.

(1) Registration Operation of MFA

First, registration operation of the MFA is described.

In the MFA, the polling process unit 11 is launched every predetermined time. The launched polling process unit 11 reads the HA setting table, and transmits a registration request to a registered IP address.

At that time, a destination port number is randomly selected. If there is no response, different port numbers are selected sequentially, so that the registration request is transmitted to various destination port numbers until a normal registration response is returned.

When the down-direction communication process unit 16 receives a registration response, if the registration response is a normal response, the MFA sets the destination port number of the registration request at this time into the HA setting table. After that, the polling process unit 11 issues the registration request only to the port number. In addition, a normal registration response stores an IP address of the MN, so that the MFA sets this information into the filer table. Then, the MFA returns a registration response acknowledgment to the HA.

When the registration response is a redirect response, the MFA overwrites an IP address of the HA table with an IP address stored in the redirect response so as to clear HA port number and the filter table. Accordingly, the polling process unit 11 performs registration processes to a new HA.

When the MFA does not receive a registration response for equal to or greater than a predetermined time, the MFA determines that the HA is deleted so as to rewrite the IP address of the HA table into an initial value, and clear the HA port number and the filter table.

(2) Registration Operation of HA

Next, registration operation of the HA is described.

When the up-direction communication process unit 24 of the HA receives a registration request from the MFA, process is passed to the cache management unit 26. The cache management unit 26 searches the MFA master table using the MAC address of the MFA included in the registration request as a key to find a corresponding record.

When the record type of an extracted record is MN, the up-direction communication process unit 24 stores the IP address of the MN into a registration response packet to return a registration normal response to the MFA. On the other hand, when the record type is HA, the up-direction communication process unit 24 returns a registration redirect response including a redirect destination IP address.

When the up-direction communication process unit 24 of the HA receives a registration response acknowledgement from the MFA, process is passed to the cache management unit 26. The cache management unit 26 updates the binding cache based on address information of the packet of the registration response acknowledgment or the registration request.

(3) Up-Direction Data Transfer Procedure in MFA

Figure 12:
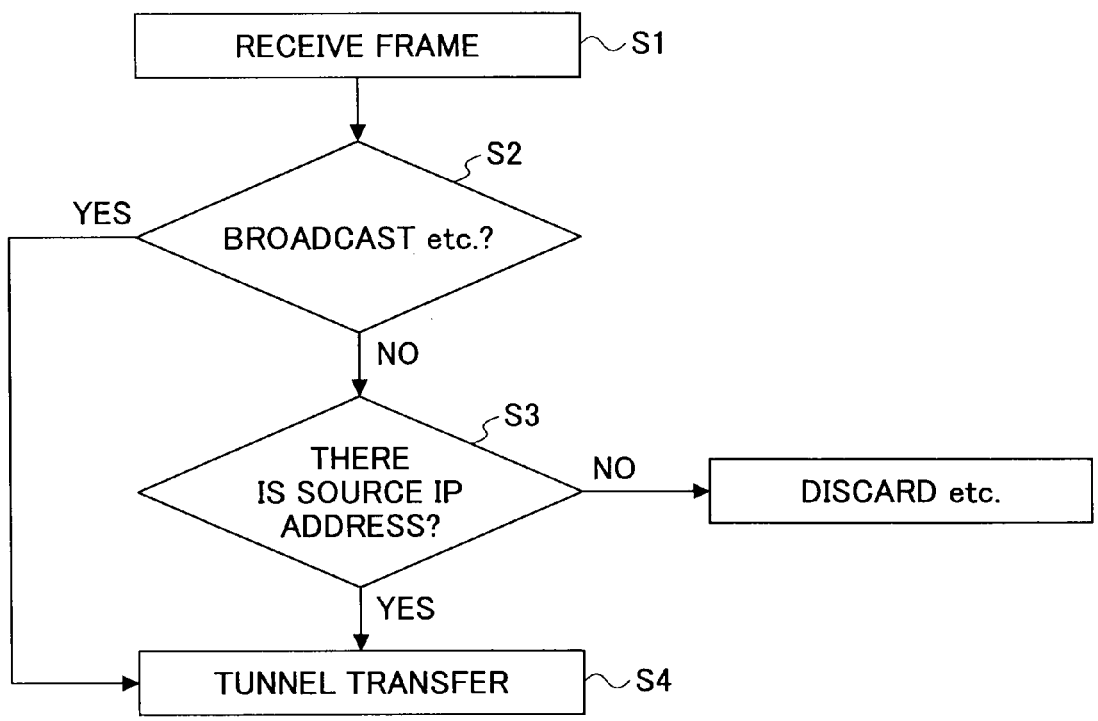
FIG. 12 is a diagram for explaining a data transfer procedure in an up direction of the MFA in the layer 2 tunneling scheme.

Next, up-direction data transfer procedure of the MFA in the layer 2 tunneling scheme is described with reference to the flowchart of FIG. 12.

The up-direction communication process unit of the MFA receives every packet including the Ethernet™ header from an interface connected to the MN (step 1). When a destination address of the received Ethernet™ frame is a broadcast address or a multicast address (Yes in step 2), tunnel transfer operation starts (step 4). When the received Ethernet™ frame includes an IP packet, and when the source IP address is registered in the MN filter table (Yes in step 3), tunnel transfer operation starts (step 4). In other cases, nothing is performed.

In step 4, the MFA refers to the HA setting table, and when the IP address and the port number of the HA are registered, the MFA adds a MIP common header before the Ethernet™ frame to be transmitted and transmits the packet to the registered HA using UDP.

(4) Up-Direction Data Transfer Procedure in HA

Figure 13:
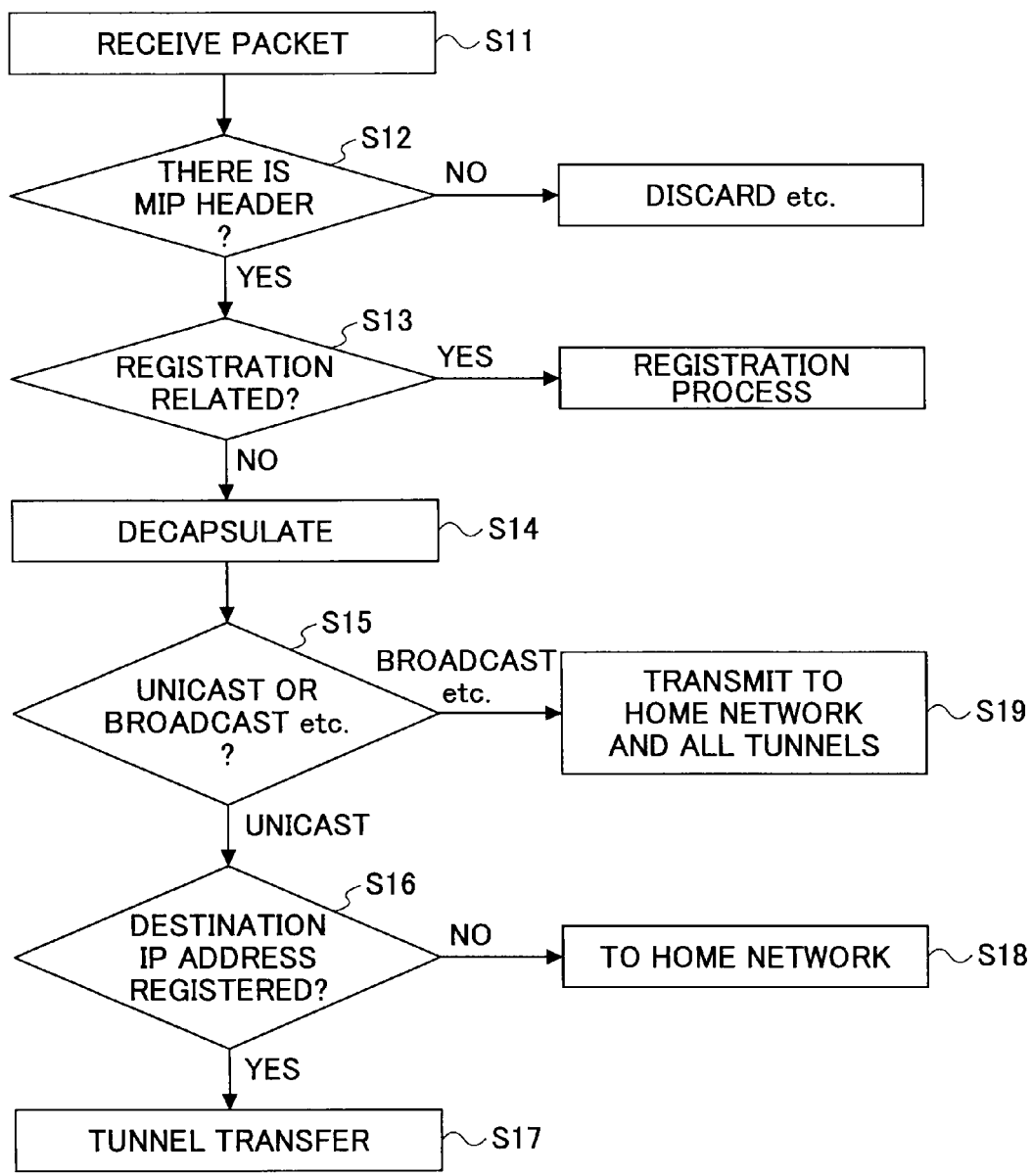
FIG. 13 is a diagram for explaining a data transfer procedure in an up direction of the HA in the layer 2 tunneling scheme.

Next, an up-direction data transfer procedure in the HA in the layer 2 tunneling scheme is described with reference to the flowchart of FIG. 13.

The HA receives every UDP packet addressed to the own IP address at an interface for receiving packets from the MFA irrespective of the value of the destination port number (step 11). The HA determines whether there is a MIP header after the UDP packet, and when there is the MIP header, the HA determines that the packet is one addressed to the own HA (Yes in step 12).

When the received packet is a packet addressed to the own HA, the HA refers to the MIP header of the packet to determine whether the packet is a registration related packet or a user frame storing packet (step 13). When it is the registration related packet, the HA passes the packet to the cache management unit, and performs the before mentioned registration process.

When the packet is the user frame packet, the HA removes the MIP header to extract an Ethernet™ frame from the packet (step 14).

When the Ethernet™ frame extracted in step 14 is unicast and when the PDU is an IP packet (unicast in step 15), a destination IP address is extracted. Then, the HA refers to the binding cache to check if a corresponding IP address is registered (step 16). When the binding cache includes the IP address, the HA re-encapsulates the Ethernet™ frame to transmits it to the tunnel (step 17).

When the IP address does not exist in the binding cache (No in step 16), the Ethernet™ frame is transmitted to the home network side so that it is received by a holder (router and the like in the home network) of the destination MAC address (step 18).

In step 15, when the destination MAC address of the Ethernet™ frame is a broadcast or a multicast address, the HA transmits the Ethernet™ frame to the home network, and re-encapsulates the Ethernet™ frame and transmits it to currently opened every tunnel by referring to the binding cache (step 19). Transmission destination IP address and UDP port and source port number are in accordance with registration of entries in the binding cache. Accordingly, the broadcast/multicast frame is received by every node connected to the home network irrespective of whether the node is moving or not. Thus, mobile IP communication can be realized since ARP mechanism works even between MNs that are under movement.

(5) Down-Direction Data Transfer Procedure in HA

Figure 14:
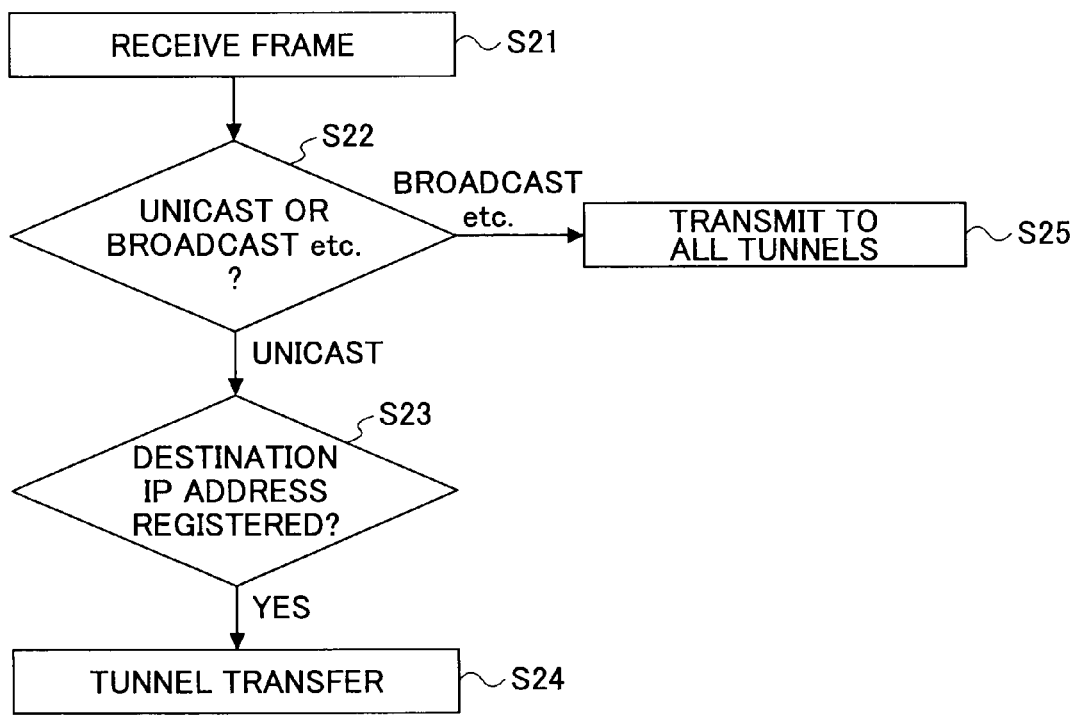
FIG. 14 is a diagram for explaining a data transfer procedure in a down direction of the HA in the layer 2 tunneling scheme.

Next, the down-direction data transfer procedure of the HA in the layer 2 tunneling scheme is described with reference to FIG. 14.

The HA receives every packet including Ethernet™ header at an interface connected to the home network of the HA. (step 21).

When the received Ethernet™ frame is unicast and when the PDU is an IP packet (unicast in step 22), the HA extracts a destination IP address and checks whether a corresponding MN is registered (whether the MN is moving) by referring to the binding cache (step 23). When the IP address is not registered in the binding cache, noting is performed anymore.

When a destination IP address is registered in the binding cache (Yes in step 23), the HA encapsulates the Ethernet™ frame and transmit it to the tunnel (step 24). Transmit destination IP address and UDP port, and source port number are set in accordance with a corresponding entry of the binding cache.

When a destination MAC address of the received Ethernet™ frame is broadcast or multicast (broadcast etc. in step 22), the HA encapsulates the frame to transmit it to every tunnel registered in the binding cache (step 25). Transmit destination IP address and UDP port, and source port number are set in accordance with a corresponding entry of the binding cache.

(6) Down-Direction Data Transfer Procedure in MFA

Figure 15:
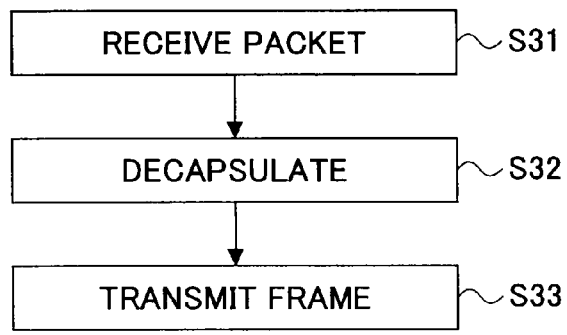
FIG. 15 is a diagram for explaining a data transfer procedure in a down direction of the MFA in the layer 2 tunneling scheme.

Next, the down-direction data transfer procedure of the MFA in the layer 2 tunneling scheme is described with reference to FIG. 15.

An IP address is assigned to an interface connected to a visit destination network of the MFA according to an address assignment function such as DHCP of the visit destination network. A packet from the HA arrives at this interface.

The MFA receives the packet from the HA as a UDP datagram (step 31). Since the datagram includes the MIP header, decapsulation is performed so as to delete the header to extract an Ethernet™ frame (step 32).

The MFA transmits the decapsulated Ether frame to an interface to which the MN is connected (step 33). When the Ethernet™ frame is broadcast or multicast, every MN connected to the interface receives it. When the Ethernet™ frame is a unicast frame, only a MN having the destination MAC address receives the Ethernet™ frame.

Second Embodiment

[System Configuration Outline]

Figure 16:
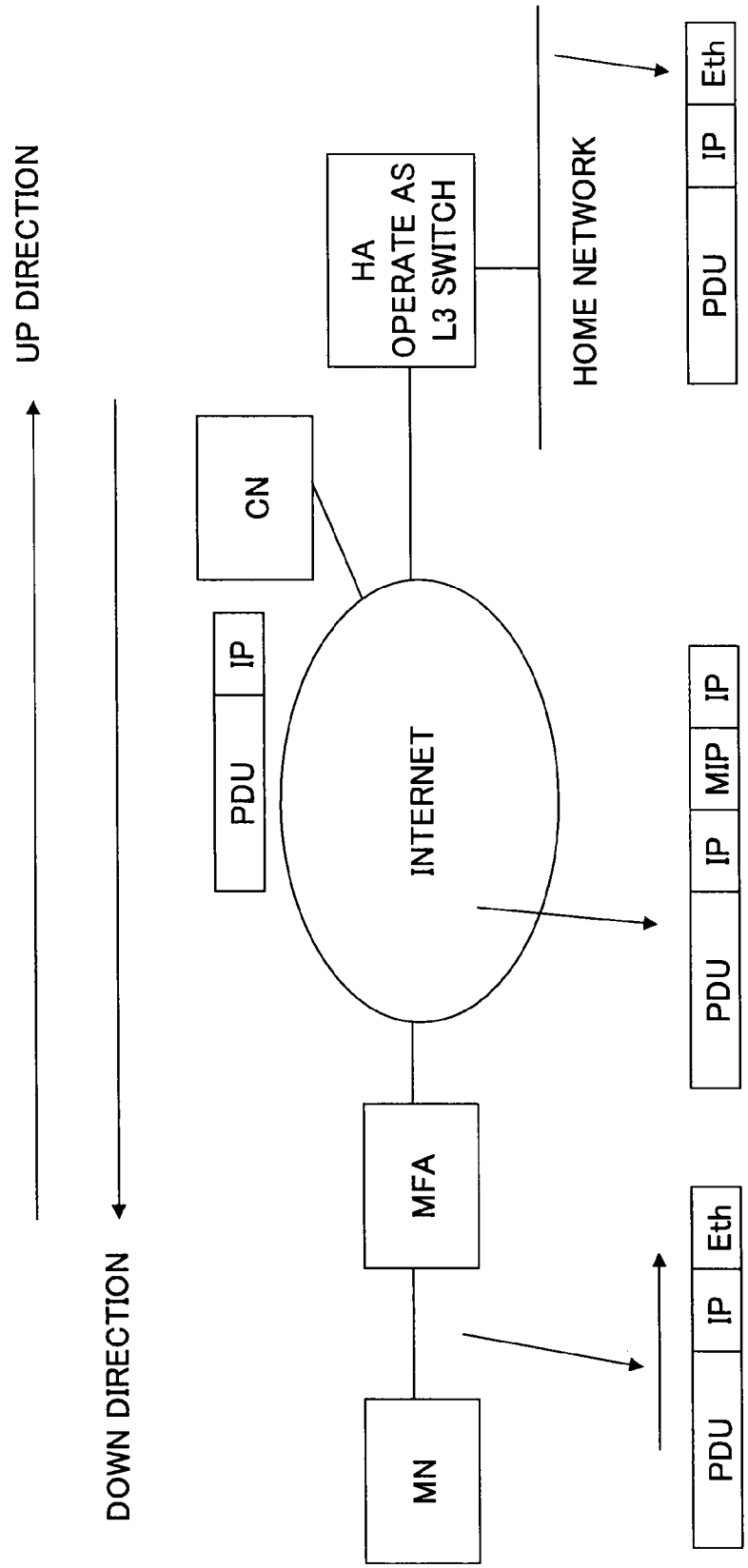
FIG. 16 is a system configuration diagram of the layer 3 tunneling scheme.

Next, the layer 3 tunneling scheme is described as the second embodiment of the present invention. FIG. 16 shows a system configuration of the layer 3 tunneling scheme. In the layer 3 tunneling scheme, the HA operates as a router (layer 3 switch). In the following, operation outline of the layer 3 tunneling scheme is described.

The interface connected to the MN in the MFA does not have an IP address, and the MFA receives every Ethernet™ frame transmitted from the MN. In addition, when ARP request is transmitted from the MN, the MFA determines whether a source IP address of the ARP request is the same as an IP address of the MN registered in the filter. When they are the same, the MFA responds the own MAC address for the ARP. That is, the MFA operates as a proxy ARP.

Next, a unicast frame is transmitted from the MN. When the source IP address is one registered in the filter, the MFA deletes the Ethernet™ header, and performs encapsulation covering the IP header to transmit it to the HA. The HA decapsulates the frame received from the tunnel to extract the IP packet. Then, the HA transfer the IP packet to a proper destination based on the IP header. That is, the HA functions as a router.

When the HA receives an IP datagram from a CN or the home network, the HA refers to the binding cache. When the destination IP address is registered, the HA performs IP-in-IP encapsulation based on the incoming address included in the entry to transmit the packet to the MFA via the tunnel. The MFA determines whether the destination IP address is the same as an address included in the filter, and when they are the same, the MFA obtains a destination MAC address using ARP, and adds an Ethernet™ header to transmit it as a unicast frame to the MN.

Figure 17:
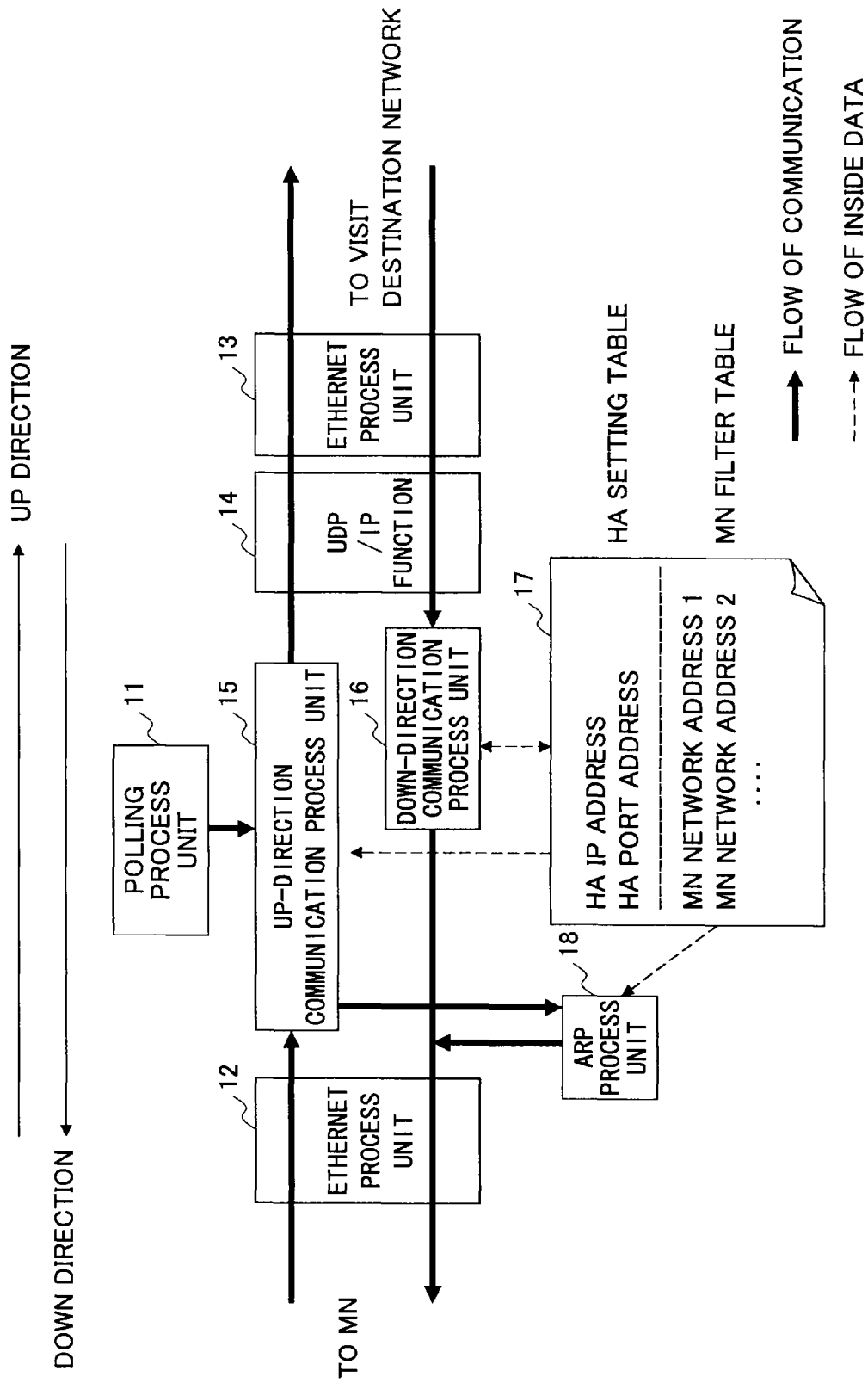
FIG. 17 is a functional block diagram of the MFA in the layer 3 tunneling scheme.
Figure 18:
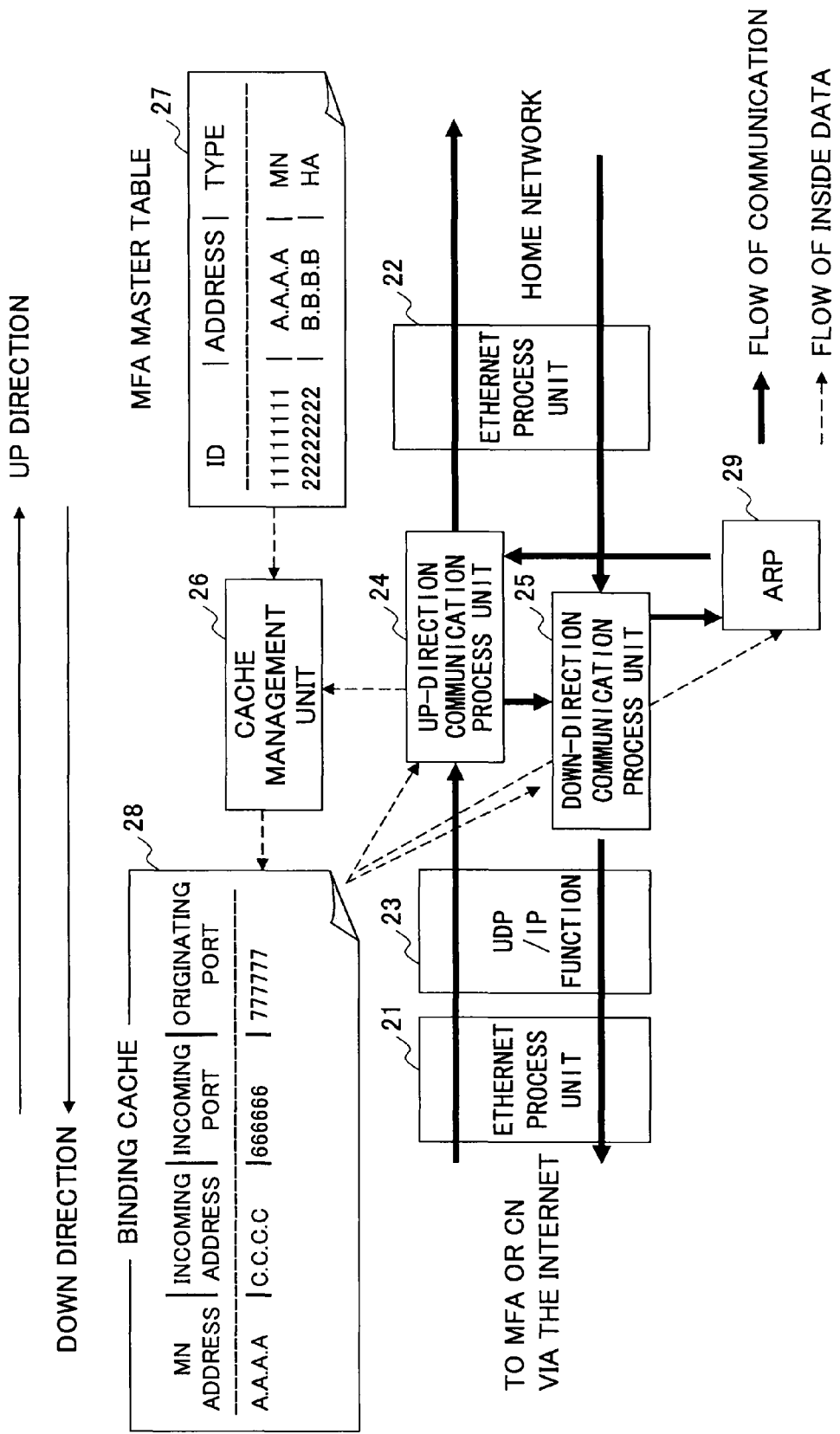
FIG. 18 is a functional block diagram of the HA in the layer 3 tunneling scheme.

Apparatus configurations of the MFA and the HA are shown in FIGS. 17 and 18 respectively. As shown in FIGS. 17 and 18, they are different from the MFA and the HA of the first embodiment in that each of them includes an ARP process unit.

[Detailed Operation]

Next, operation of each apparatus in the layer 3 tunneling scheme is described in detail.

(1) Up-Direction Data Transfer Procedure of MFA

Figure 19:
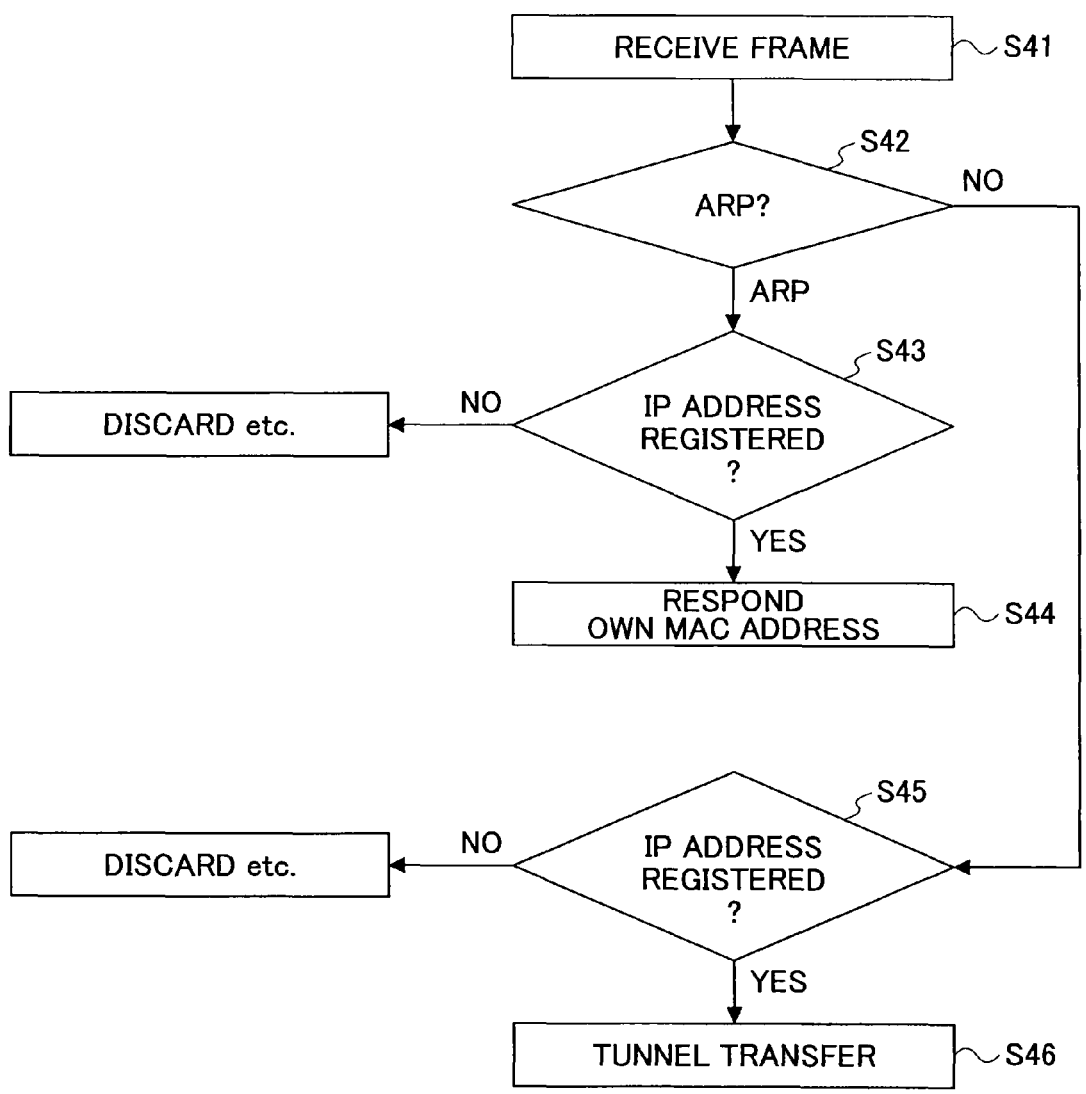
FIG. 19 is a diagram for explaining a data transfer procedure in an up direction of the MFA in the layer 3 tunneling scheme.

First, the up-direction data transfer procedure of the MFA in the layer 3 tunneling scheme is described with reference to FIG. 19.

The MFA receives an Ethernet™ frame addressed to the own MAC address at the MN side interface. As to broadcast frames, the MFA receives only ARP request (step 41).

When the received frame is the ARP request (ARP in step 42), the MFA extracts an IP address of the communication request source and compares the IP address with the MN filter table. If the address is registered in the filter table (Yes in step 43), since the ARP request is one transmitted from the MN, the process goes to step 44.

In step 44, the MFA returns a reply in which the own MAC address is set in Target MAC to the MN irrespective of the request destination IP address of the ARP request. Accordingly, a unicast frame transmitted from the MN can be received by the MFA.

In step 42, when the MFA receives a unicast frame addressed to the own MAC address, the MFA removes an Ethernet™ frame of the received unicast frame to verify that the PDU is an IP datagram. When it is checked that the source IP address of the IP header is registered in the MN filter table (Yes in step 45), the MFA encapsulates the IP datagram to transmit it to the HA using UDP (step 46).

(2) Up-Direction Data Transfer Procedure of HA

Figure 20:
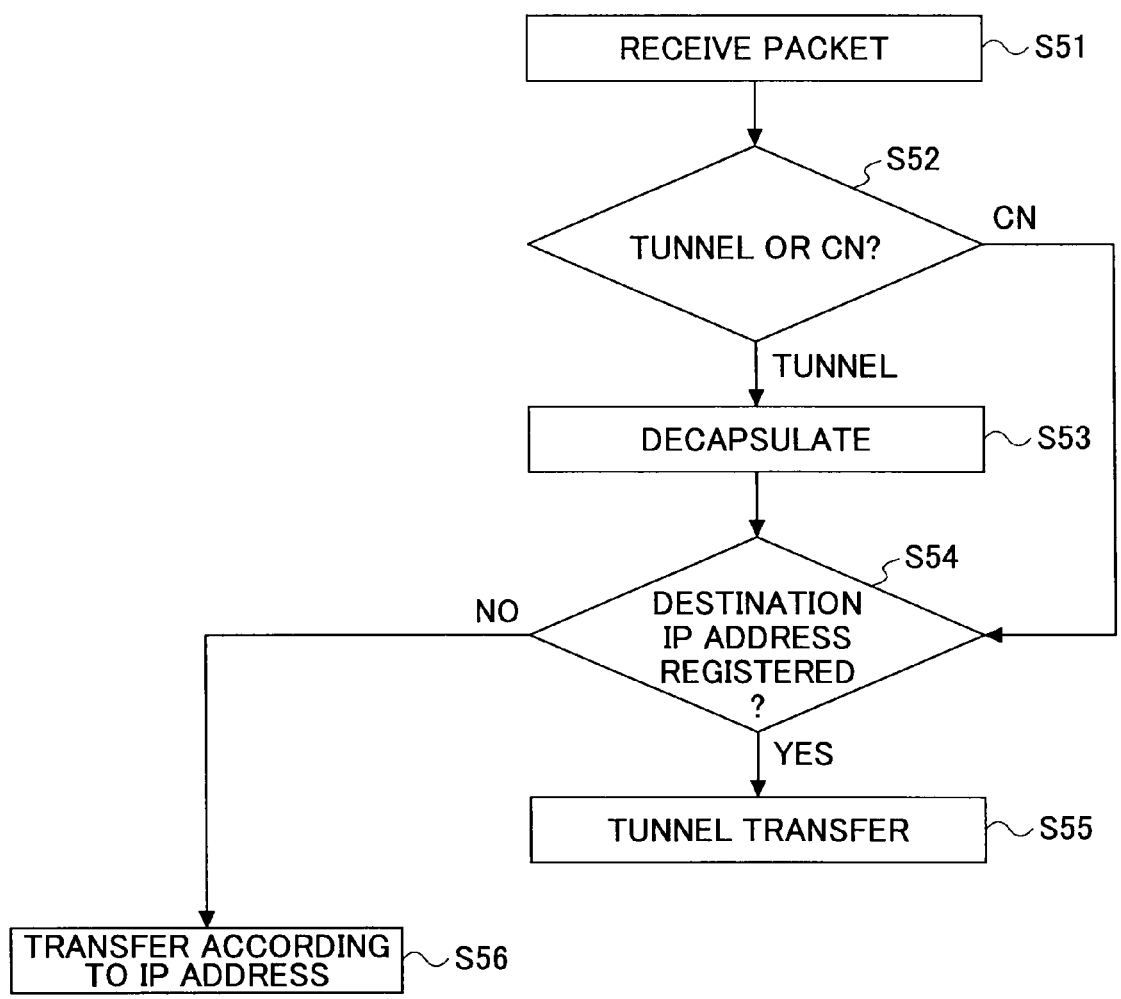
FIG. 20 is a diagram for explaining a data transfer procedure in an up direction of the HA in the layer 3 tunneling scheme.

Next, the up-direction data transfer procedure of the HA in the layer 3 tunneling scheme is described with reference to FIG. 20.

The internet side interface of the HA receives two kinds of IP packets that are an IP packet transmitted from a CN to the home network and an encapsulated IP packet transmitted from the MN via the tunnel.

When the HA receives the packet (step 51), the HA determines whether the packet is one received from the tunnel or one transmitted from the CN (step 52). In this embodiment, when the packet is addressed to the own IP address, and has a UDP datagram, and has a MIP header after that, the HA determines that the packet is a frame received from the tunnel. The HA determines other IP datagram as one transmitted from the CN.

When the HA determines that the received packet is a packet received from the tunnel (tunnel in step 52), the HA removes the MIP header to make a normal IP packet (step 53). When the received packet is a packet received from the CN (CN in step 52), the process moves to a next process as it is.

Next, when the destination IP address of the IP packet is the home network, the HA refers to the binding cache to check whether the destination MN is registered (step 54). When the corresponding address is found in the binding cache, the IP packet is encapsulated to be transmitted to specified address and port (step 55). When the destination IP address is not found in the binding cache (No in step 54), the HA transfers the IP packet according to the IP address (step 56). That is, when the IP address indicates the home network, the HA transmits the IP packet to the home network side, and when the destination of the IP packet is not the home network, since the IP packet is for a CN, the HA transmits the IP packet to the Internet.

(3) Down-Direction Data Transfer Procedure in HA

Figure 21:
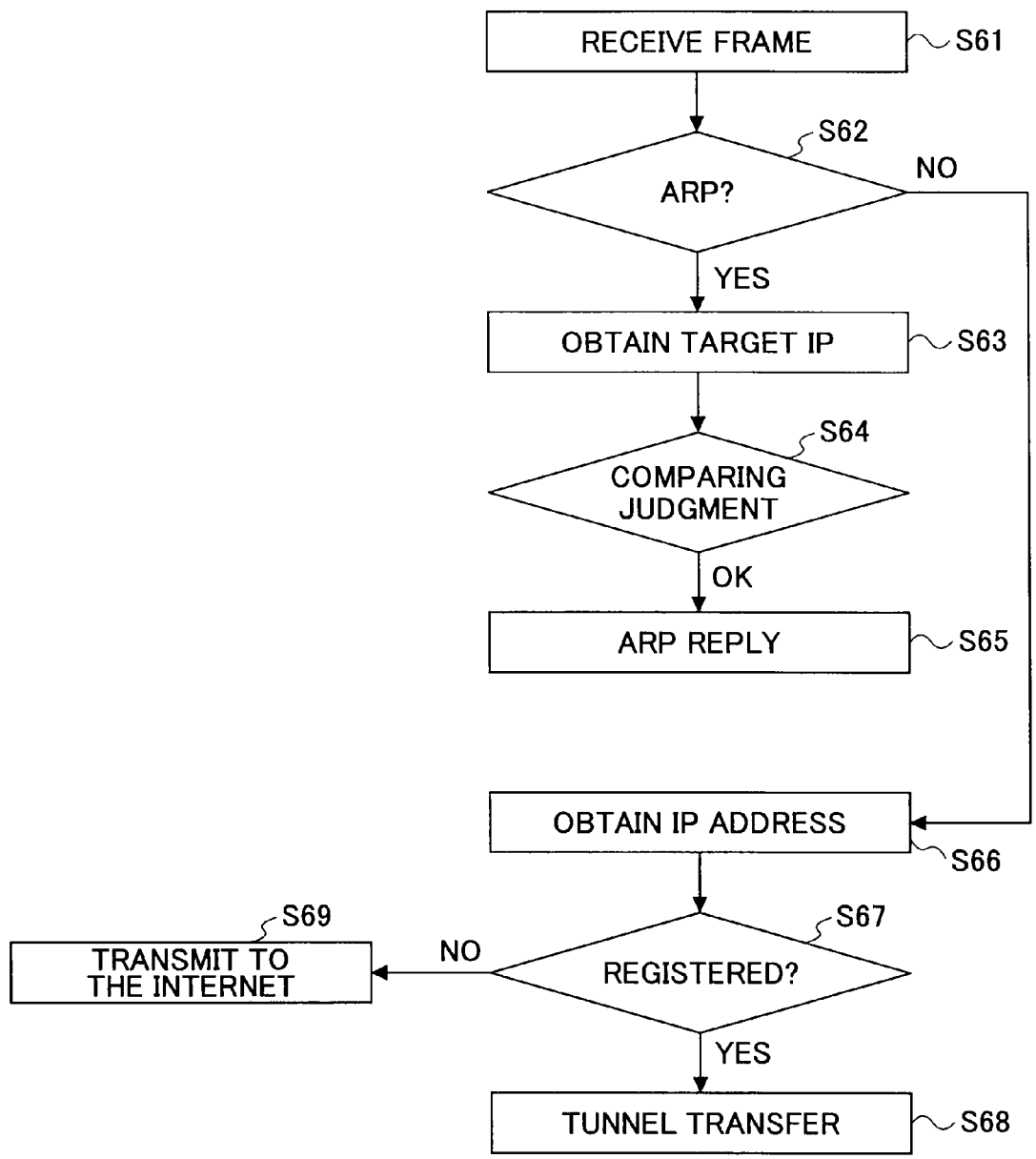
FIG. 21 is a diagram for explaining a data transfer procedure in a down direction of the HA in the layer 3 tunneling scheme.

Next, the down-direction data transfer procedure of the HA in the layer 3 tunneling scheme is described with reference to FIG. 21.

The HA only receives an Ethernet™ frame addressed to the own MAC, and an ARP request among broadcast frames at a MN side interface (step 61).

In step 62, when the received Ethernet™ frame is an ARP request (Yes in step 62), the HA extracts Target IP of the communication request destination (step 63). The HA determines whether the address is the own address or whether a corresponding MN is registered by comparing the address with the binding cache (step 64). When the determination result indicates agreement (Ok in step 64), the HA goes to step 65 to return an ARP reply. When the determination result does not indicate agreement, since an ARP reply should not be returned, the HA does not perform anything.

In step 65, that is, when the request destination IP address of the ARP request is the own IP address (this occurs when a node connected to the home network tries to transmit a packet to the HA that corresponds to a default route in order to connect to the Internet), or, when the request destination IP address of the ARP request directs to the MN that is moving, since the HA should receive the packet once, the HA responds an ARP reply (step 65). The HA stores a MAC address of an interface connected the home network side of the HA into the ARP reply to be returned.

In step 62, when the received Ethernet™ frame is a unicast frame addressed to the own MAC address (No in step 62), the HA removes the Ethernet™ header from the received unicast frame to check that the PDU is an IP datagram, and extracts a destination IP address from the IP header (step 66). When the IP address is one registered in the binding cache (Yes in step 67), the HA encapsulates the IP datagram and transmits it to a corresponding MFA using UDP (step 68). In step 67, when the IP address is not one registered in the binding cache, since it is addressed to a CN, the HA transmits the IP packet to the Internet (step 69).

(4) Down-Direction Data Transfer Procedure in MFA

Figure 22:
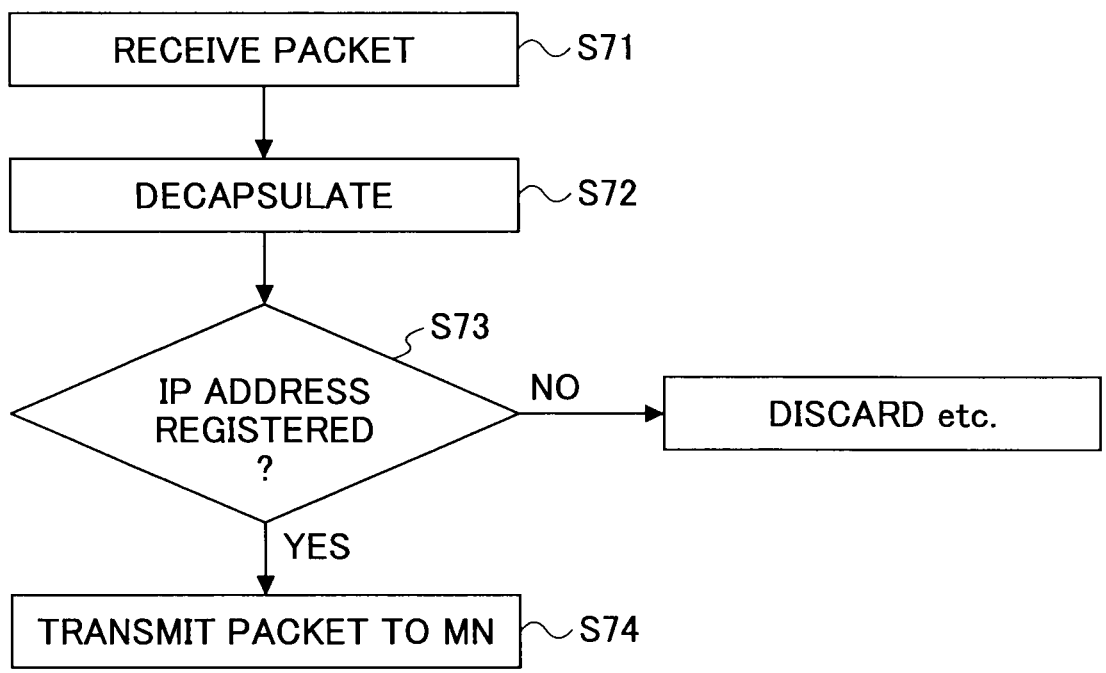
FIG. 22 is a diagram for explaining a data transfer procedure in a down direction of the MFA in the layer 3 tunneling scheme.

Next, the down-direction data transfer procedure of the MFA in the layer 3 tunneling scheme is described with reference to FIG. 22.

An IP address is assigned to an interface connected to a visit destination network of the MFA according to an address assignment function such as DHCP of the visit destination network. The MFA receives a packet from the HA at this interface (step 71). The received packet is received as a UDP datagram. Since the datagram includes the MIP header, decapsulation is performed so as to delete the header to extract an IP packet (step 72). The MFA extracts a destination IP address included in the IP header to refer to the MN filter table. When the address information are the same (Yes in step 73), the MFA transmits the IP packet to the MN side network using normal ARP processes (step 74).

As described above, by using the system described in the first and second embodiments, mobile IP can be realized without providing a special mechanism in the MN and the move destination network. Especially, since it is not necessary to provide a special mechanism to the MN, a copy machine and a POS register for which special software cannot be installed beforehand can be used as the MN.

The present invention is not limited to the specifically disclosed embodiments, and variations and modifications may be made without departing from the scope of the invention.

The present international application claims priority based on Japanese patent application No. 2005-331763 filed in the JPO on Nov. 16, 2005 and the entire contents of the Japanese patent application are incorporated herein by reference.

The invention claimed is:

1. A communication method in a communication system including a user terminal, a mobile agent apparatus connected to the user terminal, and a home agent apparatus connected to a home network of the user terminal, the communication method comprising:

storing, in a storing unit of the home agent apparatus, a Media Access Control (MAC) address of the mobile agent apparatus and a first layer 3 address of the user terminal corresponding to the MAC address of the mobile agent apparatus, in a table in association with each other, and storing a second MAC address of a second mobile agent apparatus and a second layer 3 address of a second home agent apparatus corresponding to the second MAC address of the second mobile agent apparatus, in the table in association with each other, the mobile agent apparatus and the second mobile agent apparatus being different;

receiving, by the home agent apparatus, a registration request that includes the MAC address of the mobile agent apparatus from the mobile agent apparatus, obtaining, by the home agent apparatus from the table in the storing unit, the first layer 3 address of the user terminal that corresponds to the MAC address included in the registration request, registering, by the home agent apparatus, the first layer 3 address of the user terminal, a source layer 3 address of the registration request, and a source port number of the registration request in an address correspondence table by associating them with each other, and holding, by the mobile agent apparatus, the first layer 3 address of the user terminal;

when the user terminal transmits a packet to a communication partner terminal, receiving, by the mobile agent apparatus, a layer 2 frame from the user terminal, and if a source layer 3 address in a layer 3 header in the layer 2 frame is registered, encapsulating, by the mobile agent apparatus, the received layer 2 frame to transmit the layer 2 frame to the home agent apparatus;

decapsulating, by the home agent apparatus, the encapsulated layer 2 frame to extract the layer 2 frame, and transmitting, by the home agent apparatus, the layer 2 frame to the home network, and transferring, by a router that accommodates the home network, a packet to the communication partner terminal;

when the communication partner terminal transmits a packet to the user terminal, receiving, by the home agent apparatus, a layer 2 frame from the home network, checking, by the home agent apparatus, that a destination layer 3 address in a layer 3 header in the layer 2 frame is registered in the address correspondence table, and encapsulating, by the home agent apparatus, the layer 2 frame to transmit the layer 2 frame to the source layer 3 address and the source port number of the registration request that are registered in the address correspondence table with the destination layer 3 address;

receiving, by the mobile agent apparatus, the encapsulated layer 2 frame, decapsulating, by the mobile agent apparatus, the encapsulated layer 2 frame to extract the layer 2 frame, and transmitting, by the mobile agent apparatus, the layer 2 frame to the user terminal; and when the home agent apparatus receives a registration request, including the second MAC address, transmitted from the second mobile agent apparatus, referring, by the home agent apparatus, to the storing unit to transmit a redirect response including the second layer 3 address of the second home agent apparatus to the second mobile agent apparatus.

2. A communication method in a communication system including a user terminal, a mobile agent apparatus connected to the user terminal, and a home agent apparatus connected to a home network of the user terminal, the method comprising:

storing, in a storing unit of the home agent apparatus, a Media Access Control (MAC) address of the mobile agent apparatus and a first layer 3 address of the user terminal corresponding to the MAC address of the mobile agent apparatus, in a table in association with each other, and storing a second MAC address of a second mobile agent apparatus and a second layer 3 address of a second home agent apparatus corresponding to the second MAC address of the second mobile agent apparatus, in the table in association with each other, the mobile agent apparatus and the second mobile agent apparatus being different;

receiving, by the home agent apparatus, a registration request that includes the MAC address of the mobile agent apparatus from the mobile agent apparatus, obtaining, by the home agent apparatus from the table in the storing unit, the first layer 3 address of the user terminal that corresponds to the MAC address included in the registration request, registering, by the home agent apparatus, the first layer 3 address of the user terminal, a source layer 3 address of the registration request, and a source port number of the registration request in an address correspondence table by associating them with each other, and holding, by the mobile agent apparatus, the first layer 3 address of the user terminal;

when the user terminal transmits a packet to a communication partner terminal, receiving, by the mobile agent apparatus, a layer 2 frame from the user terminal, and if a source layer 3 address in a layer 3 header in the layer 2 frame is registered, encapsulating, by the mobile agent apparatus, by the mobile agent apparatus, a packet obtained by deleting a layer 2 header of the received layer 2 frame to transmit the packet to the home agent apparatus;

decapsulating, by the home agent apparatus, the encapsulated packet to extract the packet, and transferring, by the home agent apparatus, the packet based on a layer 3 header;

when the communication partner terminal transmits a packet to the user terminal, receiving, by the home agent apparatus, the packet, checking, by the home agent apparatus, that a destination layer 3 address in a layer 3 header of the packet is registered in the address correspondence table, and encapsulating, by the home agent apparatus, the packet to transmit the packet to the source layer 3 address and the source port number of the registration request that are registered in the address correspondence table with the destination layer 3 address;

receiving, by the mobile agent apparatus, the encapsulated packet, decapsulating, by the mobile agent apparatus, the encapsulated packet to extract the packet, and transmitting, by the mobile agent apparatus, the packet to the user terminal; and when the home agent apparatus receives a registration request, including the second MAC address, transmitted from the second mobile agent apparatus, referring, by the home agent apparatus, to the storing unit to transmit a redirect response including the second layer 3 address of the second home agent apparatus to the second mobile agent apparatus.

3. The communication method as claimed in claim 2, further comprising:

when the mobile agent apparatus receives an Address Resolution Protocol request from the user terminal, if the mobile agent apparatus checks that a source layer 3 address of the Address Resolution Protocol request is registered in the mobile agent apparatus, transmitting, by the mobile agent apparatus, an own Media Access Control address to the user terminal as a response to the Address Resolution Protocol request.

4. A mobile agent apparatus used in a communication system including a user terminal, the mobile agent apparatus connected to the user terminal, and a home agent apparatus connected to a home network of the user terminal, the mobile agent apparatus comprising:

a registration request unit configured to transmit a registration request that includes a Media Access Control (MAC) address of the mobile agent apparatus to the home agent apparatus;

a response reception unit configured to receive a registration response to the registration request from the home agent apparatus, to store, in a storing unit, a layer 3 address of the user terminal corresponding to the MAC address of the mobile agent apparatus and included in the registration response from the home agent apparatus, and to transmit a registration response acknowledgement to the home agent apparatus;

a unit configured to receive a layer 2 frame from the user terminal, and if a source layer 3 address in a layer 3 header in the layer 2 frame is registered in the storing unit, to encapsulate the received layer 2 frame, and to transmit the layer 2 frame to the home agent apparatus; and a unit configured to receive an encapsulated layer 2 frame, to decapsulate the encapsulated layer 2 frame to extract a layer 2 frame, and to transmit the layer 2 frame to the user terminal, when the home agent apparatus is not proper for the mobile agent apparatus, the response reception unit receives, from the home agent apparatus, a redirect response including a layer 3 address of a proper home agent apparatus so that the registration request unit transmits a registration request to the proper home agent apparatus.

5. A mobile agent apparatus used in a communication system including a user terminal, the mobile agent apparatus connected to the user terminal, and a home agent apparatus connected to a home network of the user terminal, the mobile agent apparatus comprising:

a registration request unit configured to transmit a registration request that includes a Media Access Control (MAC) address of the mobile agent apparatus to the home agent apparatus;

a response reception unit configured to receive a registration response to the registration request from the home agent apparatus, to store, in a storing unit, a layer 3 address of the user terminal corresponding to the MAC address of the mobile agent apparatus and included in the registration response from the home agent apparatus, and to transmit a registration response acknowledgement to the home agent apparatus;

a unit configured to receive a layer 2 frame from the user terminal, and if a source layer 3 address in a layer 3 header in the layer 2 frame is registered in the storing unit, to encapsulate a packet obtained by deleting a layer 2 header of the received layer 2 frame to transmit the packet to the home agent apparatus; and a unit configured to receive an encapsulated packet from the home agent apparatus, to decapsulate the encapsulated packet to extract a packet, and to transmit the packet to the user terminal, when the home agent apparatus is not proper for the mobile agent apparatus, the response reception unit receives, from the home agent apparatus, a redirect response including a layer 3 address of a proper home agent apparatus so that the registration request unit transmits a registration request to the proper home agent apparatus.

6. The mobile agent apparatus as claimed in claim 5, wherein, when the mobile agent apparatus receives an Address Resolution Protocol request from the user terminal, if a source layer 3 address of the Address Resolution Protocol request is registered in the storing unit, and the mobile agent apparatus transmits an own Media Access Control address to the user terminal as a response to the Address Resolution Protocol request.

7. A home agent apparatus in a communication system including a user terminal, a mobile agent apparatus connected to the user terminal, and the home agent apparatus connected to a home network of the user terminal, the home agent apparatus comprising:

a storing unit configured to store a Media Access Control (MAC) address of the mobile agent apparatus and a first layer 3 address of the user terminal corresponding to the MAC address of the mobile agent apparatus, in a table in association with each other, and to store a second MAC address of a second mobile agent apparatus and a second layer 3 address of a second home agent apparatus corresponding to the second MAC address of the second mobile agent apparatus, in the table in association with each other, the mobile agent apparatus and the second mobile agent apparatus being different;

a request reception unit configured to receive a registration request that includes the MAC address of the mobile agent apparatus from the mobile agent apparatus, to obtain from the table in the storing unit the first layer 3 address of the user terminal that corresponds to the MAC address included in the registration request, to register the first layer 3 address of the user terminal, a source layer 3 address of the registration request, and a source port number of the registration request in an address correspondence table by associating them with each other;

a unit configured to receive an encapsulated layer 2 frame including a packet addressed to a communication partner terminal from the mobile agent apparatus, to decapsulate the encapsulated layer 2 frame to extract the layer 2 frame, and to transmit the layer 2 frame to a router in the home network;

a unit configured to receive a layer 2 frame including a packet from the home network, and, if a destination layer 3 address in a layer 3 header in the layer 2 frame is registered in the address correspondence table, to encapsulate the layer 2 frame to transmit the layer 2 frame to the source layer 3 address and the source port number of the registration request that are registered in the address correspondence table with the destination layer 3 address; and a unit configured to, when the request reception unit receives a registration request, including the second MAC address, transmitted from the second mobile agent apparatus, refer to the storing unit to transmit a redirect response including the second layer 3 address of the second home agent apparatus to the second mobile agent apparatus.

8. A home agent apparatus in a communication system including a user terminal, a mobile agent apparatus connected to the user terminal, and the home agent apparatus connected to a home network of the user terminal, the home agent apparatus comprising:

a storing unit configured to store a Media Access Control (MAC) address of the mobile agent apparatus and a first layer 3 address of the user terminal corresponding to the MAC address of the mobile agent apparatus, in a table in association with each other, and to store a second MAC address of a second mobile agent apparatus and a second layer 3 address of a second home agent apparatus corresponding to the second MAC address of the second mobile agent apparatus, in the table in association with each other, the mobile agent apparatus and the second mobile agent apparatus being different;

a request reception unit configured to receive a registration request that includes the MAC address of the mobile agent apparatus from the mobile agent apparatus, to obtain from the table in the storing unit the first layer 3 address of the user terminal that corresponds to the MAC address included in the registration request, to register the first layer 3 address of the user terminal, a source layer 3 address of the registration request, and a source port number of the registration request in an address correspondence table by associating them with each other;

a unit configured to decapsulate an encapsulated packet addressed to a communication partner terminal to extract the packet, and to transfer the packet based on a layer 3 header to the communication partner terminal;

a unit configured to check that a destination layer 3 address in a layer 3 header of a received packet is registered in the address correspondence table, and to encapsulate the packet to transmit the packet to the source layer 3 address and the source port number of the registration request that are registered in the address correspondence table with the destination layer 3 address; and a unit configured to, when the request reception unit receives a registration request, including the second MAC address, transmitted from the second mobile agent apparatus, refer to the storing unit to transmit a redirect response including the second layer 3 address of the second home agent apparatus to the second mobile agent apparatus.

9. The communication method as claimed in claim 1, wherein the first layer 3 address of the user terminal and the second layer 3 address of the second home agent apparatus are both IP addresses.

10. The communication method as claimed in claim 1, further comprising:

transmitting, by the home agent apparatus to the mobile agent apparatus, the first layer 3 address of the user terminal that corresponds to the MAC address included in the registration request; and receiving, by the mobile agent apparatus, the first layer 3 address of the user terminal, wherein the holding, by the mobile agent apparatus, holds the first layer 3 address of the user terminal after the receiving receives the first layer 3 address of the user terminal.

* * * * *